(12) United States Patent
Krishnan Gorumkonda

(10) Patent No.: US 10,958,895 B1
(45) Date of Patent: Mar. 23, 2021

(54) HIGH SPEED AUTOMATED CAPTURE OF 3D MODELS OF PACKAGED ITEMS

(71) Applicant: Amazon Technologies, Inc., Seattle, WA (US)

(72) Inventor: Gurunandan Krishnan Gorumkonda, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 15/725,031

(22) Filed: Oct. 4, 2017

(51) Int. Cl.
| | |
|---|---|
| *H04N 13/271* | (2018.01) |
| *G06Q 10/08* | (2012.01) |
| *G06T 15/04* | (2011.01) |
| *G06T 17/20* | (2006.01) |
| *G06T 15/20* | (2011.01) |
| *H04N 13/243* | (2018.01) |
| *H04N 13/246* | (2018.01) |
| *H04N 13/254* | (2018.01) |
| *H04N 13/257* | (2018.01) |
| *H04N 13/296* | (2018.01) |
| *B25J 9/16* | (2006.01) |

(52) U.S. Cl.
CPC ......... *H04N 13/271* (2018.05); *G06Q 10/087* (2013.01); *G06T 15/04* (2013.01); *G06T 15/205* (2013.01); *G06T 17/205* (2013.01); *H04N 13/243* (2018.05); *H04N 13/246* (2018.05); *H04N 13/254* (2018.05); *H04N 13/257* (2018.05); *H04N 13/296* (2018.05); *B25J 9/1697* (2013.01); *G06T 2215/16* (2013.01); *Y10S 901/47* (2013.01)

(58) Field of Classification Search
CPC .. H04N 13/271; H04N 13/257; H04N 13/246; H04N 13/254; H04N 13/296; H04N 13/243; G06Q 10/087; G06T 15/04; G06T 15/205; G06T 17/205
USPC .......................................................... 348/47
See application file for complete search history.

(56) References Cited

U.S. PATENT DOCUMENTS

| | | | | |
|---|---|---|---|---|
| 2011/0157373 A1* | 6/2011 | Ye | ............................. | G06T 7/85 348/187 |
| 2012/0253201 A1* | 10/2012 | Reinhold | .............. | A61B 5/1113 600/473 |
| 2016/0016311 A1* | 1/2016 | Konolige | ................. | B25J 5/007 700/245 |

(Continued)

*Primary Examiner* — Talha M Nawaz
*Assistant Examiner* — Matthew David Kim
(74) *Attorney, Agent, or Firm* — Patterson + Sheridan, LLP

(57) ABSTRACT

Method and apparatus for generating a three-dimensional (3D) model of a physical object. An apparatus includes stereo near-infrared camera devices, near-infrared projectors, color camera devices and control logic. The control logic detects a physical object moving along a fixed path has reached a predefined location, projects a predefined pattern onto the physical object, using the plurality of near-infrared projectors, and captures near-infrared digital images of the physical object, while the predefined pattern is being projected onto the physical object. The control logic determines a set of depth measures for each of the stereo near-infrared camera devices and generates a 3D mesh by merging the depth measurements. Color digital images are captured using the color camera devices, and a texture is applied to the 3D mesh by mapping points from each of the plurality of color digital images onto the 3D mesh.

20 Claims, 10 Drawing Sheets

(56) References Cited

U.S. PATENT DOCUMENTS

| | | | |
|---|---|---|---|
| 2016/0150217 A1* | 5/2016 | Popov | H04N 13/271 348/48 |
| 2018/0039848 A1* | 2/2018 | Konolige | G06T 7/75 |
| 2018/0055440 A1* | 3/2018 | Ming | A61B 5/445 |
| 2018/0285611 A1* | 10/2018 | D'Ercoli | G06K 7/10722 |

* cited by examiner

HIGH SPEED AUTOMATED CAPTURE OF 3D MODELS OF PACKAGED ITEMS

BACKGROUND

The present description relates to three-dimensional (3D) modelling and, more specifically, to computerized techniques for automatically generating a 3D model of a packaged item through the use of visible and non-visible wavelength cameras.

Modern inventory systems, such as those in mail-order warehouses, supply chain distribution centers, and custom-order manufacturing facilities, face significant challenges in responding to requests for inventory items. As inventory systems grow, the challenges of simultaneously completing many packing, storing, and other inventory-related tasks become non-trivial. For instance, in product distribution centers (e.g., fulfillment centers), vast quantities of products are processed for shipment to consumers traditionally using manual labor and/or mechanical handling equipment.

Currently, many products within product distribution centers are processed manually by employees in some fashion. For example, even in highly automated product distribution environments, an employee may be required to manually place a product onto a machine for automated packaging. While it can be advantageous to replace certain manual operations with an automated system (e.g., particular highly repetitive operations which can result in a repetitive use injury to the employee over a period of time), in many situations it is critical that any such automated system be capable of operating at a very high rate of success. For example, a robotic arm that is capable of retrieving an item from a bin and placing the item on a conveyer belt may be unacceptable for use in a product distribution center, if the robotic arm has a high rate of failing to retrieve the item or a significant likelihood of dropping the item on the way to the conveyer belt, as such failures could significantly delay the workflow of the distribution center.

DETAILED DESCRIPTION

Figure 1:
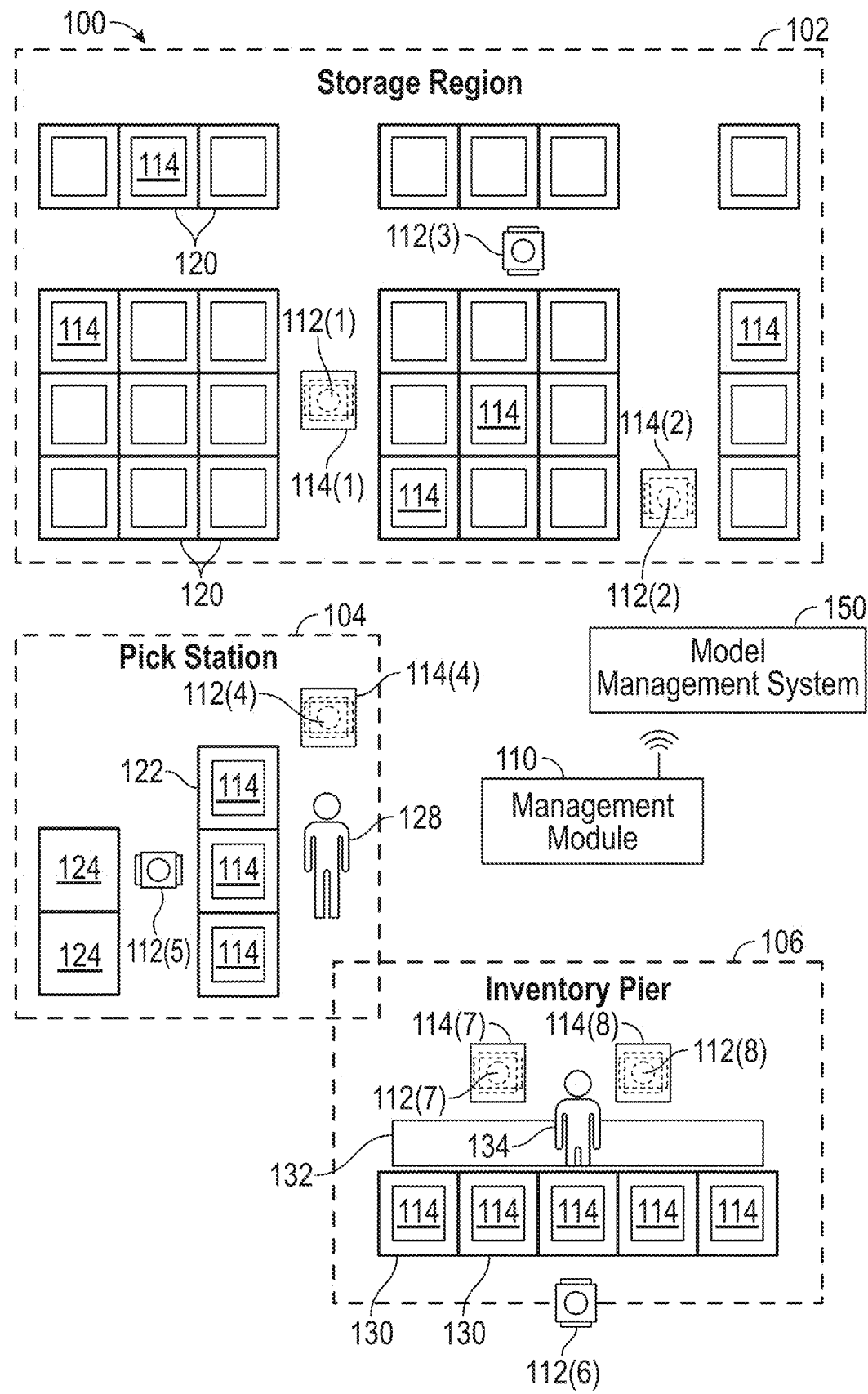
FIG. 1 illustrates an inventory system having multiple regions and mobile drive units that carry inventory holders about the regions.

Inventory systems are utilized by many entities for storing and managing inventory. For example, some retailers may utilize a warehouse of racks that store inventory items in various bins. When an order for a specific inventory item needs to be filled by the retailer, a worker typically retrieves the inventory item from the bin where the inventory item is stored.

Inventory systems according to one embodiment described herein utilize one or more mobile drive units to automatically retrieve inventory holders from warehouse storage. The inventory holders may be entire racks of shelves, with each shelf having bins for various inventory items. Mobile drive units may be self-powered robotic devices configured to move freely about the warehouse. Racks may be transported by mobile drive units to a pick station for performing inventory operations. The station may include a human operator and/or automated equipment to remove desired inventory items from the inventory holders and complete orders. In some operations, the items are removed from inventory holders and placed on order holders, which too can be maneuvered by the mobile drive units. Throughout this document, reference is made to inventory holders as the racks that are moved about by the mobile drive units. It is noted that inventory holders is used in the general sense as structures that hold inventory items, items that are part of an order, packaging elements for the orders, and essentially any other item or element that might be used by the inventory and fulfillment system. As such, inventory holders may also be referred to as holders, order holders, container holders, bins, and so forth.

Mobile drive units may move about the warehouse and/or retrieve inventory holders in response to commands and/or instructions received from an automated guidance system. For example, a management module may control administration and coordination of certain elements and/or tasks within the warehouse. The management module may receive orders for inventory items in the warehouse and coordinate task assignments for fulfilling the orders, including providing instructions to mobile drive units to transport racks with requested inventory items to an inventory station for completion of an order. The management module may also provide guidance at the inventory station for how the order is to be assembled.

In a distribution warehouse for an office supply store, the management module may receive an order for a printer, several ink cartridges, and a box of paper. The management module may determine the locations of these items within the racks of storage in the distribution warehouse. The items may, for instance, be on the shelves of three separate racks. The management module may issue tasks for three different mobile drive units to retrieve each rack respectively holding the printer, ink cartridges, and paper, and for the mobile drive units to transport the racks holding those items to an inventory station where the three items may be picked from the respective racks and packed into a box for shipment. In doing so, the management module may coordinate the various tasks such that all of the orders received by the management module are fulfilled in an efficient manner.

The mobile drive units are continuously moving the inventory holders into and out from the pick stations to place the appropriate items near the pickers at the right time. ("Pickers" are the human or autonomous operators that retrieve items from the inventory holders.) In many product distribution centers, picking operations are performed manually by employees. As such, although many aspects of sophisticated product distribution centers are automated, a significant number of tasks are still performed manually.

Increasingly, automated systems are being used to replace highly repetitive manual operations traditionally performed by employees and which can cause harm (e.g., repetitive use injuries) to the employees over time, such automation is particularly challenging to implement in a product distribution center, which frequently process products of dramatically different shapes and sizes. As such, while a robotic tool can be trained to reliably perform a particular action for a particular size and shape of object relatively easily, it is significantly more challenging to implement a robotic tool that can reliably perform the particular action for objects of various shapes and sizes. For example, depending on an object's shape and size, factors such as how to pick-up the object (e.g., with a single suction device, with multiple suction devices, with a robotic claw that grasps the object, etc.), where to pick-up the object (e.g., in the middle of a dense, flat surface with a suction device, as opposed to on a non-rigid surface through which air can easily pass), and so on. As a result, training an automated system to operate in such an environment can be a very difficult task.

Three-dimensional (3D) modelling generally refers to the process of generating a data structure that digital represents a physical object. For example, a 3D model of a physical object can model the object's shape, size, texture, coloration, reflectivity, and so on. More generally, substantially any physical attributes of an object can be modelled in some manner. One approach to implementing an automated system that can operate within a product distribution center where products come in various shapes and sizes is to represent each product with a respective 3D model. Such 3D models can then be used, for example, for product identification purposes (e.g., determining a unique identity of a product captured within one or more images by one or more camera devices), product detection purposes (e.g., determining whether a particular object is within the field of view of one or more camera devices), segmentation purposes (e.g., determining where in the field of view the particular object is located), pose estimation (e.g., determining how the particular object is oriented), and so on. Generally, by using an accurate 3D model for each product within a product distribution center, robotic control systems can more reliably and accurately perform automated tasks on the various products.

Many algorithms for generating a 3D model of a physical object are dependent upon obtaining images of each object from multiple viewing angles. However, as product distribution centers may service thousands, if not millions of different products, it can be prohibitive (as a practical matter) to obtain such images for every object serviced within the product distribution center. However, as discussed above, automated systems within such an environment must be capable of executing at a very high level of reliability, and such a requirement may not be possible when no 3D model is available for a given item. Other computer graphics solutions capture textured 3D models of the objects, and then render imagery for the 3D model from different viewing angles through the use of computer graphics. However, many current solutions are expensive, require a skilled operator to carry out and are relatively slow (e.g., taking minutes to hours for each product). In a product distribution center that services a substantial number of different products (e.g., millions of different products), these limitations are in many cases not simply not acceptable. That is, while user-driven approaches for generating a 3D model may be acceptable for use with a small number of products (e.g., products that that, for whatever reason, may be difficult to automatically generate an accurate 3D for), the expense and speed of such solutions makes them prohibitive as a practical matter for generating models for the entirety of the product catalog for an automated product distribution center.

As such, embodiments described herein provide techniques for capturing 3D models of physical objects. One embodiment provides an apparatus that includes a plurality of stereo near-infrared camera devices, a plurality of near-infrared projectors and a plurality of color camera devices. The apparatus further provides control logic that is configured to project a predefined pattern onto an object using the plurality of near-infrared projectors. For example, the object could pass under the apparatus on a conveyer belt, where the predefined pattern is projected onto the object. Upon detecting the object is at a predefined location on the conveyer belt, the control logic could capture digital images of the object using the stereo near-infrared camera devices. Additionally, the control logic could capture color digital images of the object using the color camera devices. In one embodiment, the near-infrared and color camera devices are arranged in a dome configuration and are oriented to as to capture images of all visible surfaces of the object from various viewpoints.

Of note, while the digital images captured by the near-infrared camera devices may depict the projected pattern, the color digital images captured using the color camera devices not depict such patterns, as the color camera devices are configured to capture visible light (e.g., with a wavelength between approximately 400 nm and 700 nm) and thus may not detect the near-infrared light (e.g., with a wavelength between approximately 700 nm and 1.1 mm) projected onto the object. As such, while the digital images captured by the near-infrared camera devices will show reflect the projected pattern, the color digital images will reflect the appearance of the physical object as would be seen by the human eye. As a result, embodiments can use the digital images captured by the near-infrared camera devices that show the projected pattern to build a 3D mesh of the physical object, and embodiments can use the images from the color camera devices can be used to texture the 3D model. Moreover, the resulting appearance of the 3D model will match the appearance of the item being modelled as seen by the human eye, as the texture applied to the model is based on images from the color camera devices which are configured to capture light in the visible light spectrum. Advantageously, by automatically building the 3D model of an object as the object moves by on a conveyer belt, embodiments described herein can support very large-scale product distribution centers, as the need for a skilled operator in building the 3D models is effectively eliminated.

Additionally, the control logic could be configured to periodically perform a self-calibration operation, thereby minimizing or even eliminating the need for routine maintenance to be performed (e.g., by a skilled operator). For example, the system could receive a notification that a calibration item is being passed through the system. Generally, the control logic may be configured with a predefined 3D model and additional information describing the appearance and physical attributes (e.g., dimensions) of the calibration item. Moreover, the calibration item may be manufactured such that each surface the calibration item contains unique patterns, thereby enabling the system to more easily and accurately identify the calibration item as well as its pose. The control logic could capture digital images of the calibration item using a plurality of stereo camera devices (e.g., the stereo near-infrared camera devices) and could calibrate internal data describing three-space positions and orientations of the plurality of stereo camera devices. For example, the control logic could extrapolate the three-space positions of the cameras, based on the appearance of the calibration item within the images captured by each camera and further based on the predefined 3D model and other information describing physical attributes of the calibration object. Such calibration information can then be used in automatically generating 3D models for additional items passing by the system. Advantageously, by performing a self-calibration operation, embodiments can ensure that the system repeatedly produces accurate 3D models, even with slight changes to the positions and orientations of the various camera devices over time.

FIG. 1 illustrates an inventory system having multiple regions and mobile drive units that carry inventory holders about the regions. The inventory system 100 may be arranged in a facility or warehouse (e.g., distribution facility, fulfillment center, etc.) that is logically organized into areas or regions associated with various functions. In the illustrated example, the warehouse includes a storage region 102, a pick station 104, and an inventory pier 106. In practice, depending upon the size of the inventory system 100, the warehouse may hold more than one of the storage regions 102, pick stations 104, and inventory piers 106, or the warehouse may be configured without the storage region 102, or the pick station 104, or the inventory pier 106.

The inventory system 100 includes a management module 110, multiple mobile drive units 112, inventory holders 114 and a training system 150. Only some of the inventory holders 114 are shown referenced with the number 114 for ease of illustration. The mobile drive units 112 are independent, self-powered robotic devices that may move freely about the warehouse, under their own direction or through coordination by the management module 110. The mobile drive units 112 may be used at various times to transport the inventory holders 114 around the warehouse among the regions. For instance, the mobile drive units 112 may transport the inventory holders 114 between the storage region 102 and the pick station 104 or inventory pier 106.

Each inventory holder 114 may be implemented as a physical structure to hold various inventory items. The inventory holder 114 has a physical length, width, and height that may be standardized or varied within the inventory system. As used herein, the inventory holders 114 may be configured to hold essentially any type or size of item or be used for any number of purposes, including, but not limited to, carrying pallets, storing shipping supplies, holding garbage, supporting empty boxes waiting for inventory, supporting filled boxes with items once orders are fulfilled, and so on. Furthermore, as used herein, inventory holders also include holders for other types of products or items and hence include order holders.

In one implementation, the inventory holder 114 may be formed as a rack having multiple shelves to support various types of inventory items. For instance, the inventory holders 114 may include multiple storage bins with each storage bin capable of holding a different type of inventory item. The inventory holders 114 are capable of being carried, rolled, or otherwise moved by the mobile drive units 112. Each inventory holder 114 may have a plurality of faces, and each bin may be accessible through specific faces. The rack is free-standing when at rest, but can be lifted and moved by the mobile drive units 112. The mobile drive units 112 may be configured to rotate inventory holders 114 at appropriate times to present particular faces of inventory holders 114 and the associated bins to an operator or other components of inventory system 10. One example is described below in more detail with reference to FIG. 2.

One or more mobile drive units 112 are provided in the storage region 102 to shuffle inventory holders 114 among the storage locations 120 and to transport the inventory holders between the storage region and other regions in the warehouse. Two loaded drive units 112(1) and 112(2) are shown in the storage area 102 carrying associated inventory holders 114(1) and 114(2), respectively, down aisles between the sets of predefined storage locations 120. An unloaded drive unit 112(3) is also shown moving through an aisle between the predefined storage locations 120.

The pick station region 104 is designed with multiple locations 122 and 124 to accommodate associated resting inventory holder 114. In FIG. 1, the pick station 104 has five locations arranged in two linear rows. A first line of three pick locations 122 is mapped next to a picking area in which a picker 126 picks inventory from the inventory holders 114 at the pick locations 122 and loads them into boxes or containers supported by another inventory holder 114(4) mounted on a mobile drive unit 112(4). In this illustration, the picker 126 is a human, although the picker may alternatively or additionally involve a mechanical picking apparatus. A second line of two staging locations 124 is mapped adjacent to, but spaced from, the first line of pick locations 122. The staging locations 124 temporarily hold inventory holders 114 on the way to and from the pick locations 122 of the pick station 104. It is noted that five locations are merely representative, and that pick stations 104 may be designed with more or fewer than five locations.

Order holders may, for example, be racks of shelving that are configured to hold boxes or containers that will be used to fill orders for inventory items. Each box or container may be associated with a particular order. For instance, an order holder may store a cardboard box that is to be used for shipping an order for several ink cartridges and several reams of paper. Order holders with orders needing such items may visit positions along the inventory pier corresponding to inventory holders storing inventory items needed by the orders. Operators may remove items from the inventory holders and place them into appropriate boxes or containers in the order holder. If necessary, the order holder may then be taken to an inventory station to fill items remaining on the orders in the boxes or containers of the order holder.

To illustrate, in the office supply example discussed above, paper may be a high volume inventory item and ink cartridges may be a highly popular item. Accordingly, a pallet of paper and an inventory holder storing various ink cartridges may be stationed at the inventory pier. An order for several packages of paper and an ink cartridge may be filled by moving an order holder a location along the inventory pier opposite to the pallet storing the paper where an operator may transfer the paper to the order holder. The order holder may then move to a location opposite the inventory holder storing the ink cartridges where the same or a different operator may transfer the ink cartridge to the order holder. If the requested printer is not already stored at the inventory pier, a mobile drive unit may transport the order holder to an inventory station, where another mobile drive unit may transport an inventory holder containing the printer so that the order can be filled.

In FIG. 1, the inventory pier 106 is shown with multiple designated pier locations 130 to accommodate the inventory holders 114. Five pier locations 130 are illustrated to accommodate five corresponding holders 114, although there may be more or fewer pier locations per inventory pier 106. One mobile drive unit 112(6) is shown at the inventory pier 106 to shuffle inventory holders 114 among the locations 130 according to the techniques described herein. Two loaded mobile drive units 112(7) and 112(8) are shown at rest next to a pier 132 and holding associated inventory holders 114(7) and 114(8) (or more specifically in this case, order holders) for access by a picker 134 (again, represented as a human although a mechanical device may be used). In this example, the inventory holders 114(7) and 114(7) may be holding packages or containers for order fulfillment, where the picker 134 removes selected items from the inventory holders 114 positioned in locations 130 and loads the items into order containers on the inventory holders 114(7) and 114(8).

In some implementations, multiple mobile drive units may be used to bring inventory holders to and from the pier locations 130 of the inventory pier 106. Incoming inventory holders may be placed in temporary locations while a single mobile drive unit, such as unit 112(6), removes an existing inventory holder that has been recently picked by the picker 134 from a pier location 130 and replaces it with a new inventory holder with new items of interest for the picker 134.

In one implementation, the management module 110 orchestrates movement of the mobile drive units 112, directing them to various regions within the warehouse. The management module 110 coordinates transport of the various inventory holders among the regions in the warehouse. Furthermore, the management module 110 may be used to instruct the mobile drive units to perform the shuffle processes within a particular region (e.g., storage region 102, pick station 104, inventory pier 106, etc.). Generally, the shuffle process involves directing a mobile drive unit 112 to reposition a first inventory holder from its current location within the region to a temporary location within the region that is adjacent or proximal to the current location. The mobile drive unit 112 leaves the first inventory holder in the temporary location and subsequently positions a second inventory holder into the location vacated by the first inventory holder. The mobile drive unit 112 then lifts the first inventory unit to transport the first inventory holder away.

The management module 110 may use any form of communication to direct the mobile drive units. In one implementation, the management module 110 and the mobile drive units are configured to communicate using wireless technologies, such as a wireless local area network (WLAN). As one example, some embodiments of mobile drive unit 112 may communicate with management module 110 and/or with one another using Wi-Fi (IEEE 802.11), Bluetooth (IEEE 802.15), Infrared Data Association standards, or any other appropriate wireless communication protocol. As another example, in a tracked inventory system 100, tracks or other guidance element upon which mobile drive units 112 move may be wired to facilitate communication between mobile drive units 112 and the management module 110 and/or other components of inventory system 100.

In addition to directing the mobile drive units, the management module 110 may receive and/or generate requests to initiate any of a number of particular operations involving the mobile drive units 112, inventory holders 114, or other elements of inventory system 100. The management module 110 may select components of inventory system 100 to perform various operations and communicate commands, instructions, and/or other appropriate information to the selected components to facilitate completion of these operations. The management module 110 may receive orders for various inventory items and coordinate and administer various appropriate tasks to fill the orders. For example, an order may specify particular inventory items that have been purchased by a customer and that are to be retrieved from inventory system 10 for shipment to the customer. The management module 110 may receive the orders from any appropriate system and generates task assignments based, in part, on the orders including requests for inventory items. Based on the orders, the management module 110 may identify particular operations to be completed involving inventory items stored or to be stored within inventory system 100.

After generating one or more task assignments, the management module 110 selects appropriate components to complete particular tasks and transmits task assignments to selected components, such as the mobile drive units, to trigger completion of the relevant tasks. The relevant components then execute their assigned tasks. Each task assignment defines one or more tasks to be completed by a particular component. These tasks may relate to the retrieval, storage, replenishment, and counting of inventory items and/or the management of mobile drive units 112, inventory holders 114, or other components of inventory system 100. Depending on the component and the task to be completed, a particular task assignment may identify locations, components, and/or actions associated with the corresponding task and/or any other appropriate information to be used by the relevant component in completing the assigned task.

Generally, the model management system 150 is configured to automatically generate 3D models of various items within the automated product distribution center 100. For instance, the model management system 150 could detect a physical object has reached a designated location, based on sensor data collected from one or more sensor devices. For example, the physical object could move along a fixed path (e.g., on a conveyer belt) until the physical object reaches the designated location. Additionally, the one or more sensor devices may be deployed to identify the type of the physical object (e.g., using a radio-frequency identification (RFID) receiver to read an RFID tag on the physical object) and to inform the model management system 150 of when the physical object reaches (or will reach) the designated location. For example, the sensor devices could include a light curtain device that detects when the physical object enters the designated location and that immediately notifies the model management system 150 of this event. As another example, the sensor devices could be deployed some distance upstream on the conveyer belt and, upon receiving an indication that the sensor devices detected the physical object passing by an upstream location on the conveyer belt, the model management system 150 could determine when the physical object will reach the designated location based on a distance between the designated location and the upstream location, as well as a fixed speed at which the conveyer belt device travels.

Once the physical object reaches the designated location, the model management system 150 could cause a number of projection devices to project a predefined pattern onto the physical object. In one embodiment, the model management system 150 is configured to project the predefined pattern using near infrared projection devices. The predefined pattern may include a number of unique shapes or designs that can easily be recognized by the model management system 150 within the captured digital images. Doing so enables the model management system 150 to more accurately and reliably map pixels (or other points, such as depth information) from one camera device to another (e.g., based on a determination that the same unique shape or design within the predefined pattern is captured in different images taken by different camera devices).

Additionally, the model management system 150 could synchronously capture a plurality of digital images of the physical object using a plurality of camera devices. For example, such camera devices could include an assortment of camera devices that operate in a visible light wavelength, as well as other cameras that operate in a non-visible light wavelength (e.g., infrared or near-infrared cameras). The model management system 150 could generate a 3D mesh based on depth values calculated from a plurality of near-infrared stereo digital images of the physical object, wherein the plurality of near-infrared digital images are synchronously captured while the predefined pattern is projected onto the physical object. The model management system 150 could then apply a texture to the 3D mesh by mapping corresponding points from each of a plurality of color digital images of the physical object onto the 3D mesh. Generally, the plurality of color digital images may be synchronously captured using a plurality of color camera devices (i.e., the plurality of color camera devices may be configured to capture images of the physical object at substantially the same moment in time). By generating the 3D model using the techniques described above, embodiments provide an efficient technique for quickly constructing a 3D model of a product without requiring user intervention.

Figure 2:
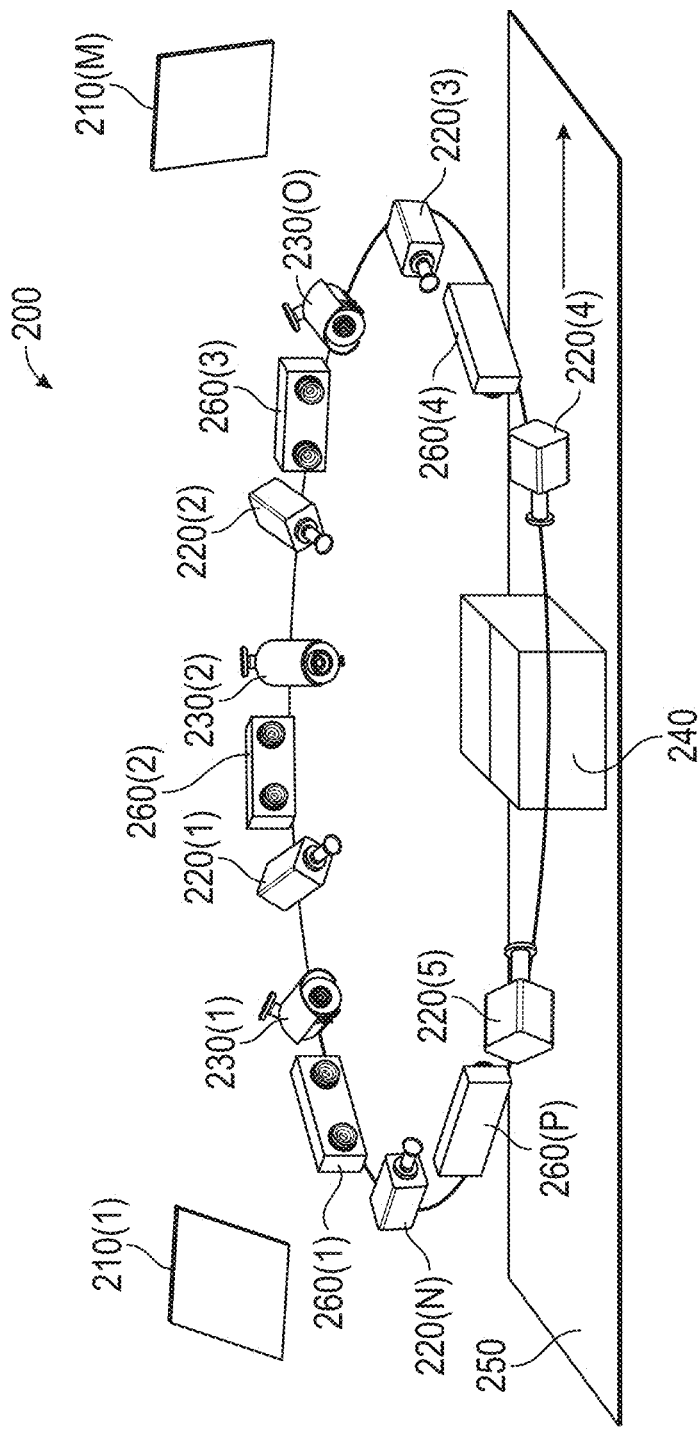
FIG. 2 is a block diagram illustrating an object capture system, according to one embodiment described herein.
Figure 3:
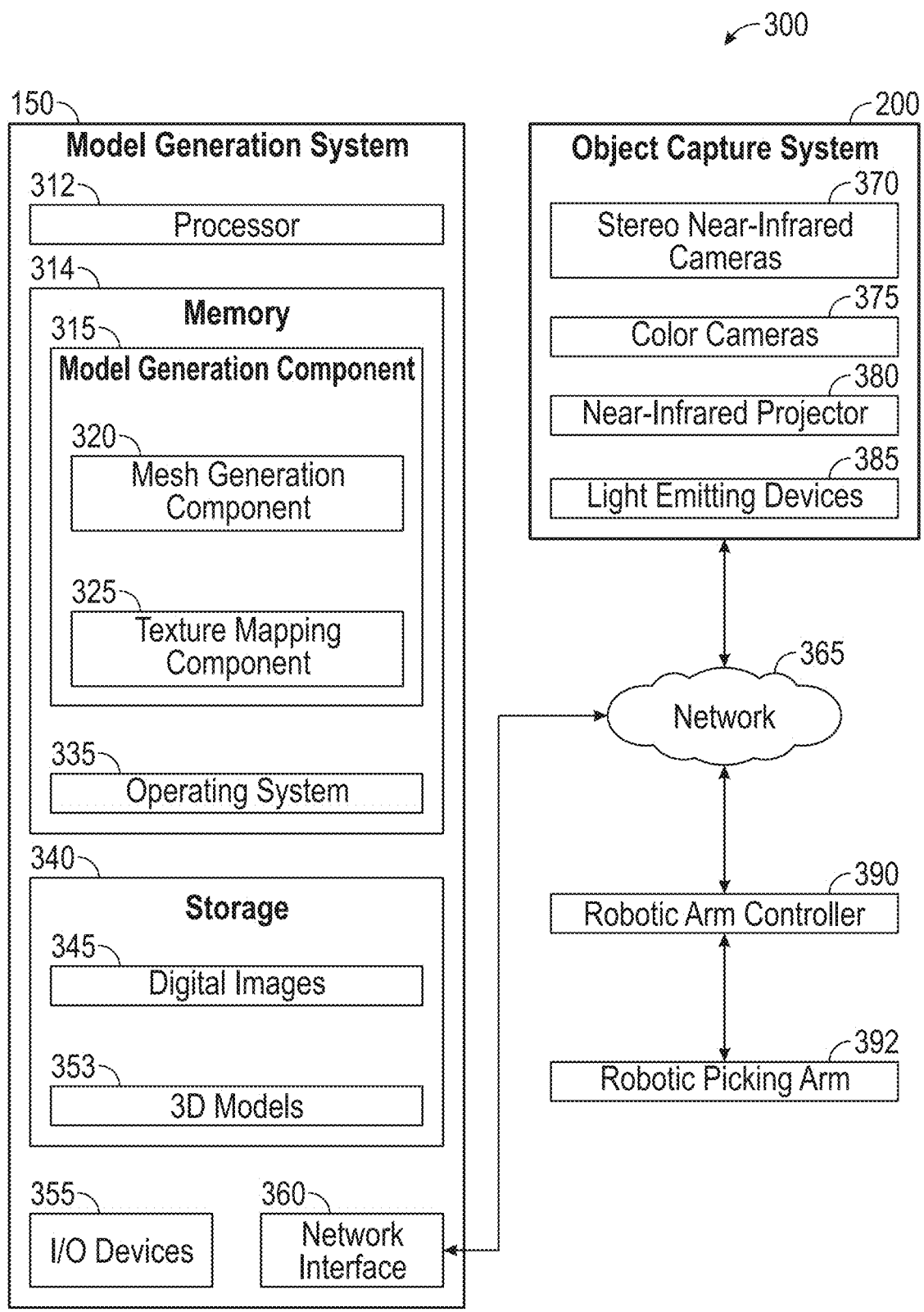
FIG. 3 is a block diagram illustrating a model generation system, according to one embodiment described herein.

FIG. 2 is a block diagram illustrating an object capture system, according to one embodiment described herein. As shown, the object capture system 200 includes light sources 210(1)-(M), color camera devices 220(1)-(N), stereo near-infrared cameras 260(1)-(P), and projection devices 230(1)-(O), oriented above a conveyer belt 250 carrying a physical object 240. The color camera devices 220(1)-(N) represent camera devices that operate in the visible light spectrum. Generally, software logic (e.g., a model generation component 315 within the model generation system 150, as shown in FIG. 3) could capture images of the physical object 240 from multiple viewpoints using the color camera devices 220(1)-(N) and the stereo near-infrared cameras 260(1)-(P), while a predefined pattern is being projected onto the physical object using the projection devices 230(1)-(O). In one embodiment, the projection devices 230(1)-(O) may be near-infrared projection devices, capable of projecting non-visible light onto the physical object. For example, the projection devices 230(1)-(O) could project light with a wavelength between approximately 700 nm and 1.1 mm that cannot be picked up in images captured by the color camera devices 220(1)-(N). In one embodiment, it is preferable to project light at a wavelength that can be clearly seen by the stereo near-infrared camera devices 260(1)-(P), but that cannot be seen by the color camera devices 220(1)-(N). Doing so enables a texture to be applied to the 3D model of the physical object 240 using the images captured by the color camera devices 220(1)-(N) and that does not include the predefined pattern being projected onto the object. As such, users viewing the 3D model of the physical object 240 can more easily recognize the appearance of the physical object, as the appearance of the model will not include the projected pattern.

In one embodiment, the model generation component 315 can perform a 3D model verification process using the color camera devices 220(1)-(N) and/or the stereo near-infrared camera devices 260(1)-(P). For example, the model generation component 315 could capture near-infrared images of the object 240 using only a portion of the stereo near-infrared camera devices 260(1)-(P) for use in generating a 3D mesh for the model, and the model generation component 315 could use the remaining stereo near-infrared camera devices 260(1)-(P) to perform a verification process for the generated 3D mesh. For example, the model generation component 315 could capture images of the object 240 using the remaining stereo near-infrared camera devices 260(1)-(P), and could determine depth values for points within the captured images. The model generation component 315 could then compare the determined depth values to depth values for points on the 3D mesh when viewed from cameras in the relative positions of the remaining stereo near-infrared camera devices 260(1)-(P). If the model generation component 315 determines that the depth values are sufficiently similar, the model generation component 315 could determine that the 3D mesh was properly generated. On the other hand, if the model generation component 315 determines that the depth values are not sufficiently similar, the model generation component 315 could determine that a problem occurred in generating the 3D mesh and could schedule the object 240 to be reprocessed for 3D model generation (e.g., by setting one or more values corresponding to the object 240, in a database used to manage the 3D model generation).

Similarly, the model generation component 315 could capture images of the object 240 using only a portion of the color camera devices 220(1)-(N), and could use the captured images to apply a texture to the 3D mesh to generate the 3D model. The model generation component 315 could then capture color images of the object 240 using the remaining color camera devices 220(1)-(N), and could determine whether the appearance of the 3D model sufficiently matches the images of the object 240 captured using the remaining color camera devices 220(1)-(N), from a viewpoint corresponding to the position of the remaining color camera devices 220(1)-(N) to the object 240. If the model generation component 315 determines that the appearance of the 3D model sufficiently matches the captured images from the remaining cameras, the model generation component 315 could determine that the 3D model was properly generated. If the model generation component 315 determines that the captured images do not sufficiently match the appearance of the textured 3D model, the model generation component 315 could determine that a problem occurred in generating the 3D model. The model generation component 315 could then discard the 3D model for the object 240 and could schedule the object 240 to be reprocessed for 3D model generation.

FIG. 3 is a block diagram illustrating a model generation system, according to one embodiment described herein. As shown, the system 300 includes a model generation system 150, an object capture system 200 and a robotic arm controller 390 for controlling a robotic picking arm 392, all connected via network 365. The object capture system 200 includes stereo near-infrared cameras 370, color cameras 375, near-infrared projectors 380 and light-emitting devices 385.

The model generation system 150 includes a processor 312, memory 314, storage 340, I/O devices 355, and a network interface 360. Processor 312 is intended to be representative of a single CPU, multiple CPUs, a single CPU having multiple processing cores, and the like. The memory 314 is included to be representative of a random access memory. As shown, memory 314 includes the model generation component 315 and an operating system 335. The model generation component 315 includes a mesh generation component 320 and a texture mapping component 325. Storage 340 includes digital images 345 and 3D models 353. The storage 340 may be a disk drive storage device. Although shown as a single unit, the storage 340 may be a combination of a fixed and/or removable storage, such as fixed disc drives, removable memory cards, optical storage, network attached storage (NAS), or storage-area-network (SAN). The network interface 360 may be any type of network communications allowing the motion analysis system 310 to communicate with other computers via a data communications network (e.g., network 365).

Generally, the model generation component 315 can analyze the digital images 345 of a given physical object that are captured by the object capture system 370 in order to generate a 3D model 353 corresponding to the physical object. For example, the model generation component 315 could receive an indication that a physical object moving along a fixed path has reached a predefined location. The model generation component 315 could then transmit instructions to the near-infrared projectors 380, to project a predefined pattern onto the physical object. For example, the predefined pattern could include a plurality of uniquely recognizable shapes arranged in a predefined format. Optimally, the predefined pattern facilitates the mapping of points (e.g., pixels, depth values, etc.) from a first image captured by a first lens to points from a second image captured by a second lens.

The model generation component 315 can transmit instructions to the object capture system 200, to cause the stereo near-infrared cameras 370 to synchronously capture a plurality of near-infrared digital images of the physical object, while the predefined pattern is being projected onto the physical object. Such captured images can then be transmitted to the model generation system 150, where the model generation component 315 can store the images as at least a portion of the digital images 345. The mesh generation component 320 could then determining, for each near-infrared digital image captured by the plurality of stereo near-infrared camera devices 370 in the digital images 345, a respective set of depth measurements. The mesh generation component 320 could then generating a three-dimensional (3D) mesh by merging the sets of depth measurements for each of the plurality of stereo near-infrared camera devices, based on positional information for the plurality of stereo near-infrared camera devices 370.

Additionally, the model generation component 315 could control (directly or indirectly, e.g., by transmitting instructions to the object capture system 200) the color cameras 375 to synchronously capture a plurality of color digital images. Such color images could be transmitted to the model generation system 150, where the model generation component 315 could store the images as at least a portion of the digital images 345. The texture mapping component 325 could then apply a dynamically determined texture to the 3D mesh by mapping points from each of the plurality of color digital images onto the 3D mesh, based on positional information for the plurality of color camera devices 375, to produce a 3D model of the physical object. The resulting 3D model could then be stored as one of the 3D models 353.

Generally, once a 3D model is generated for a given product, the 3D can be made available for use in performing various tasks, e.g., within an automated product distribution center. For instance, the 3D model could be output for display using one or more display devices, in order to help an employee easily and accurately identify which product to retrieve in performing a fulfillment center task (e.g., a pick operation). As an example, a control system within the automated product distribution center could output instructions to an employee tasked with performing a pick operation, instructing the employee to retrieve a particular item from one location and to place the item at another location. In doing so, the control system could retrieve the 3D model for the particular item and could render one or more frames depicting the 3D model. Doing so can aid the employee in more easily identifying the particular item to retrieve, thereby increasing the employee's accuracy and efficiency.

As another example, the robotic arm controller 390 could receive instructions (e.g., from the management module 110) to retrieve a particular item from a specified location. The robotic arm controller 390 could retrieve a 3D model 353 corresponding to the particular item to be retrieved, and the robotic arm controller 390 could capture one or more images of the retrieval location (e.g., a particular holder or tote within an automated product distribution center) using one or more camera devices.

In one embodiment, the robotic arm controller 390 is given instructions to take an item from a particular location, but is not given any identifying information for the item. In such an embodiment, the robotic arm controller 390 could capture images of the item in the particular location and could determine which of a plurality of pre-generated 3D models best matches the appearance of the item in the captured images. The robotic arm controller 390 could then retrieve the 3D model that best matches the item, for use in retrieving the item.

Once the 3D model is retrieved, the robotic arm controller 390 could then use the retrieved 3D model 353 for one or more object identification operations. For instance, the robotic arm controller 390 could analyze images captured of the retrieval location and could determine whether the particular item is present within the retrieval location. As an example, the robotic arm controller 390 could determine whether any portion of the captured image(s) substantially matches an appearance of the 3D model for the particular item from any viewpoint and from various distances (e.g., a predefined range of distances). If the robotic arm controller 390 determines a portion of the image substantially matches an appearance of the 3D model for the particular item, the robotic arm controller 390 could determine that the particular item is present at the retrieval location at a location corresponding to the matching portion of the image.

Additionally, the robotic arm controller 390 could determine an estimated pose of the particular item at the designated location, using the 3D model. For example, the robotic arm controller 390 could extrapolate the item's pose, based on calibration information specifying the relative three-space location of the camera capturing the image, as well as the viewpoint from which the 3D model matched the portion of the captured image. The robotic arm controller 390 could then use the estimated pose of the particular item to determine an optimal way to control the robotic picking arm 392, in order to best retrieve the particular item. For example, the robotic arm controller 390 could determine an angle of approach, an optimal surface for grasping the particular item, and so on, based on the object's estimated pose as well as object profile information for the particular item. For example, the object profile information could specify the optimal surface upon which to grasp the particular item using a suction tool of the robotic picking arm 392. The robotic arm controller 390 could determine a location of the optimal surface, based on the particular item's current pose, and could manipulate the robotic picking arm 392 to grasp the particular item by the optimal surface from a determine optimal angle.

In one embodiment, the model generation component 315 is configured to perform a calibration operation to ensure that the calibration information specifying the relative three-space positions of the stereo near-infrared cameras 370 and the color cameras 375 are accurate. For example, the model generation component 315 could determine that a calibration object has reached a designated location (e.g., the physical location the physical location the stereo near-infrared cameras 370 and the color cameras 375 are oriented to take images of). Upon identifying the calibration object, the model generation component 315 could retrieve object profile information specifying a physical size, shape and appearance of the calibration object. The model generation component 315 could capture a plurality of digital images of the first physical object using the stereo near-infrared camera devices 370 as well as the color camera devices 375. The model generation component 315 could then determine relative three-dimensional positional information for each of the plurality of stereo camera devices and the plurality of color camera devices, by construing the plurality of digital images and the plurality of color digital images in view of the retrieved object profile information for the predefined training object. The model generation component 315 could store the relative three-dimensional positional information as calibration information for the plurality of stereo camera devices and the plurality of color camera devices. Such calibration information could subsequently be used, for example, for generating a 3D model for a second physical object, by generating a 3D mesh and applying a texture to the 3D mesh, based on the determined relative three-dimensional positional information for each of the plurality of stereo near-infrared camera devices 370 and the plurality of color camera devices 375, and using images of the second physical object that are synchronously captured by the plurality of stereo near-infrared camera devices 370 and the plurality of color camera devices 375.

In some instances, the model generation component 315 is configured to perform a refinement operation for one or more of the 3D models 353 over time. For example, upon determining that a particular picking operation with the robotic picking arm 392 has failed (e.g., failed in a particular way, failed a predefined number of times, failed a predefined number of times within a designated time window, etc.), the model generation component 315 could trigger the automatic re-generation of one of the 3D models 353. In one embodiment, doing so causes an upstream robotic picking arm to place an object of a type corresponding to the 3D model to be regenerated on the conveyer belt, such that the object will reach the designated location and the model generation component 315 will automatically initiate the process of regenerating the 3D model.

In one embodiment, the robotic arm controller 390 is configured to determine an optimal manner to release a given object using a corresponding one of the 3D models 353. For example, once the robotic arm controller 390 has picked up the object in an optimal manner, the robotic arm controller 390 could determine an optimal manner to release the object in the specified destination location (e.g., within a tote container within an automated product distribution center). In doing so, the robotic arm controller 390 can retrieve an object profile for the object that specifies an optimal resting surface for the object (e.g., a flat surface of the object on which the object can rest in a stable manner). The robotic arm controller 390 could then determine how to orient the object so that the optimal surface is downward-facing, using the corresponding 3D model.

Figure 4:
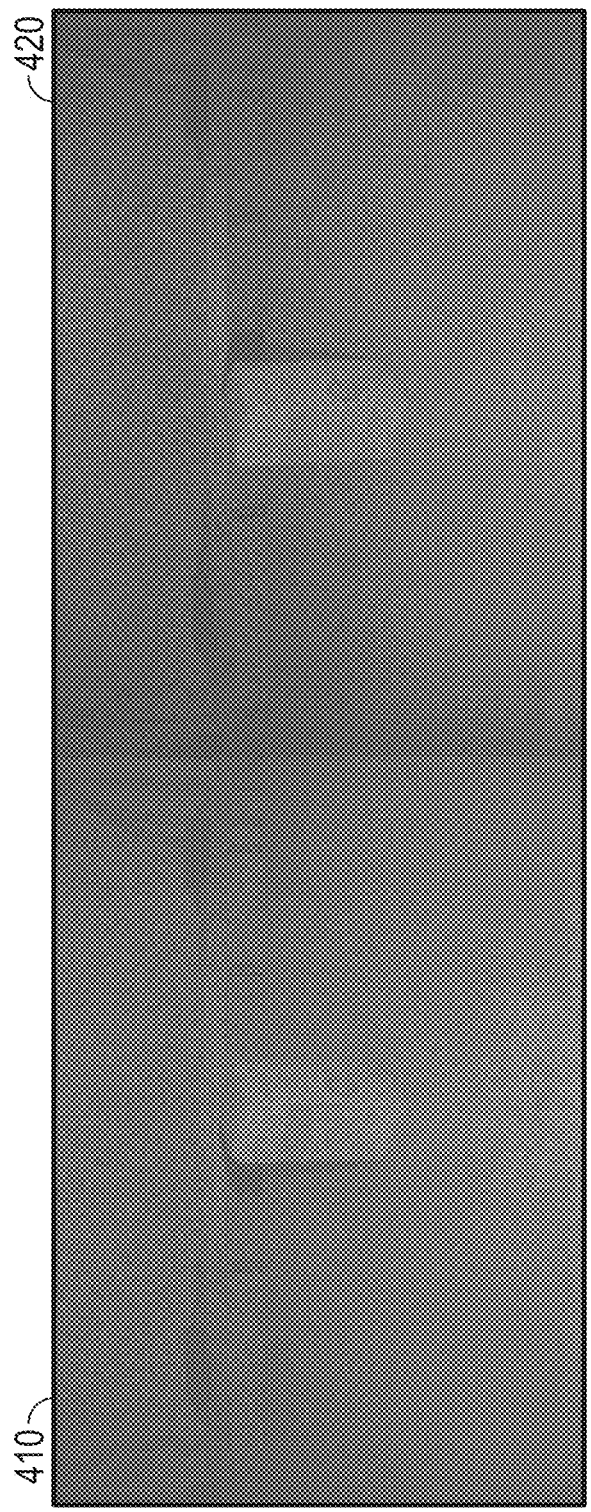
FIG. 4 illustrates images of a physical object captured from multiple different perspectives, according to one embodiment described herein.

FIG. 4 illustrates images of a physical object captured from multiple different perspectives, according to one embodiment described herein. As shown, the computer generates images 410 and 400 depict a given physical object that was captured from different viewing angles using separate lenses of a stereo near-infrared camera device. As shown, a predefined pattern of infrared light is being projected onto the physical object in the depicted example. In one embodiment, the projected pattern includes a grid of unique symbols. Such a pattern may be advantageous, for example, as the unique symbols can be relatively easily identified in any captured image. As a result, the model generation component 315 can more easily map points between images 410(1)-(N) captured by different camera devices that are viewing the object from different viewpoints, as each symbol within the projected pattern is unique within the pattern and is easily recognizable when visible within the captured images.

Figure 5:
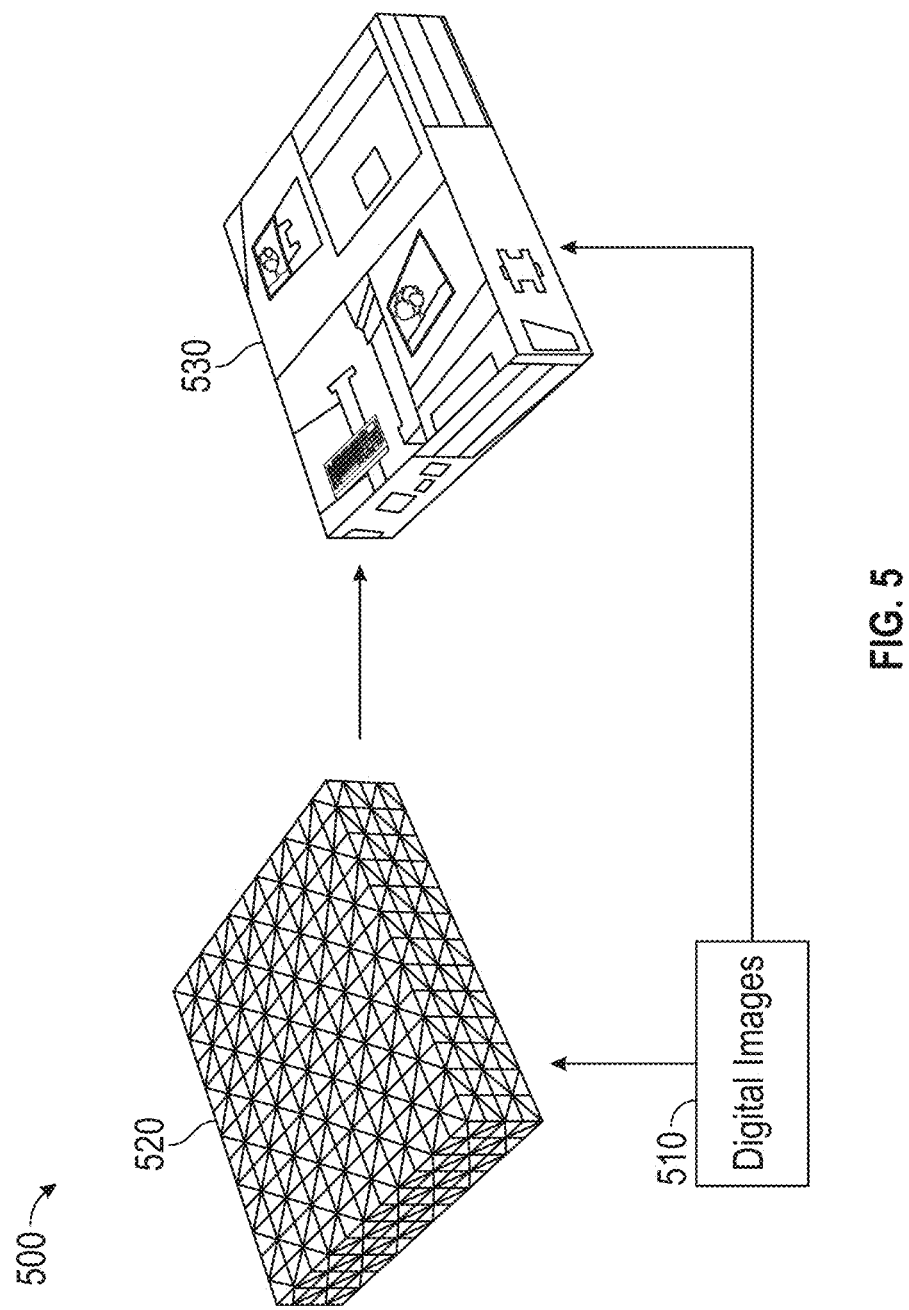
FIG. 5 illustrates a workflow for generating a three-dimensional model, according to one embodiment described herein.

FIG. 5 illustrates a workflow for generating a three-dimensional model, according to one embodiment described herein. As shown, the workflow 500 begins where the model generation component 315 analyzes a plurality of infrared digital images within the digital images 510 to generate a 3D mesh 520 of an object. For instance, the infrared digital images could have been captured by the stereo near-infrared camera devices 260(1)-(P). For example, the mesh generation component 320 could calculate a set of depth values for each captured image, and the mesh generation component 320 could merge the sets of depth values to generate the 3D mesh 520.

Generally, some products within an automated product distribution center may be more difficult to generate a 3D model, e.g., due to physical characteristics of the products (e.g., a high measure of reflectivity on the surface of the product, a coloration that makes it difficult to perceive the projected pattern in the captured images, etc.) In some instances, the initial 3D mesh generated by the mesh generation component 320 could include imperfections. For example, such imperfections could result from noise in the captured images and/or in the depth values calculated from the images, holes in the data, misalignment and/or redundancy issues in the 3D mesh, and so on. As a result, the mesh generation component 320 could perform one or more optimization operations in order to reduce or eliminate the imperfections within the initial 3D mesh. For example, the mesh generation component 320 could perform a Screened Poisson reconstruction to fit a surface onto the 3D mesh, and could then perform one or more clean-up operations on the mesh (e.g., based on predefined criteria in one or more clean-up rules that are used to identify and remove extraneous or invalid polygon geometry within the 3D mesh). The texture mapping component 325 could then apply a texture to the 3D mesh 520 by mapping pixels from particular images within the digital images 510 that were captured using the plurality of color cameras 220(1)-(N) onto the 3D mesh, resulting in the 3D model 530.

Figure 6:
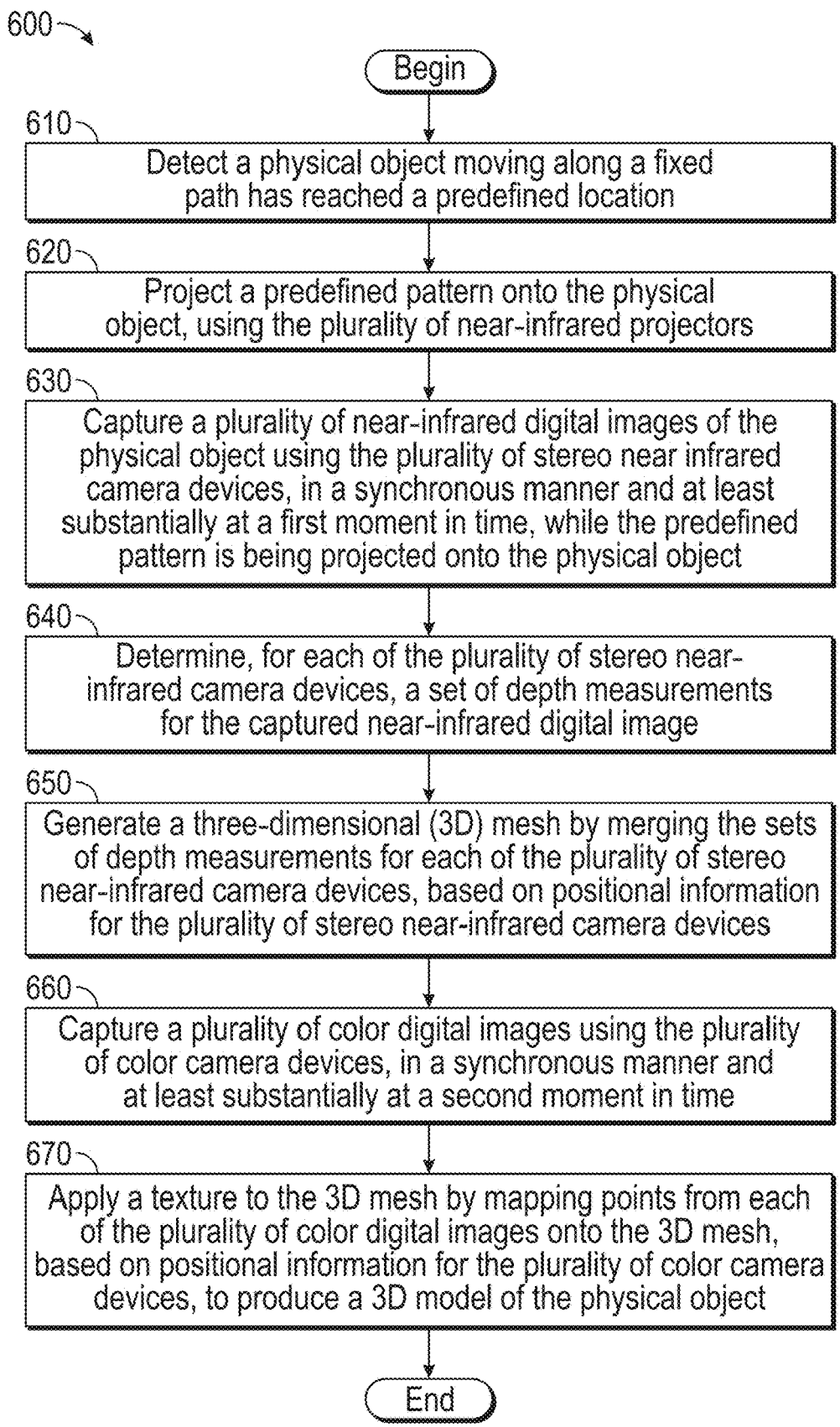
FIG. 6 is a flow diagram illustrating a method for generating a 3D model of an item using color and near-infrared cameras, as well as near-infrared projectors, according to one embodiment described herein.

FIG. 6 is a flow diagram illustrating a method for generating a 3D model of an item using color and near-infrared cameras, as well as near-infrared projectors, according to one embodiment described herein. As shown, the method 600 begins at block 610, where the model generation component 315 receives an indication that a physical object moving along a fixed path has reached a predefined location. For example, an upstream light curtain sensor could detect that the physical object has passed an upstream location on the conveyer belt. Moreover, an upstream RFID reader could retrieve identifying information for the physical object from an RFID tag on the physical object. The model generation component 315 could determine an estimated time when the physical object will reach the predefined location, based on a known distance between the upstream location and the predefined location, as well as a known, fixed speed at which the conveyer belt moves.

Once the physical object reaches the predefined location, the model generation component 315 projects a predefined pattern onto the physical object, using a plurality of near-infrared projectors (block 620). For example, the predefined pattern could include a number of unique shapes that can readily be identified within captured images. The model generation component 315 could then synchronously capturing a plurality of near-infrared digital images of the physical object using the plurality of stereo near-infrared camera devices, while the predefined pattern is being projected onto the physical object (block 630). Using the captured images, the model generation component 315 could determine, for each near-infrared digital image captured by the plurality of stereo near-infrared camera devices, a respective set of depth measurements (block 640). For example, the model generation component 315 could generate a depth value for a given point in the scene, based on a calculated difference in distance between corresponding image points from each of the two lenses of the given stereo camera devices. Advantageously, by projecting the predefined pattern onto the physical object, the model generation component 315 can more accurately map points between the various images captured by the different lenses of the stereo near-infrared cameras, and thus can more accurately determine the measures of depth for points within the captured scene.

The mesh generation component 320 generates a 3D mesh by merging the sets of depth measurements for each of the plurality of stereo near-infrared camera devices, based on positional information for the plurality of stereo near-infrared camera devices (block 650). Additionally, the model generation component 315 synchronously captures a plurality of color digital images using the plurality of color camera devices (block 660). The texture mapping component 325 applies a texture to the 3D mesh by mapping points from each of the plurality of color digital images onto the 3D mesh, based on positional information for the plurality of color camera devices, to produce a 3D model of the physical object (block 670), and the method 600 ends.

Figure 7:
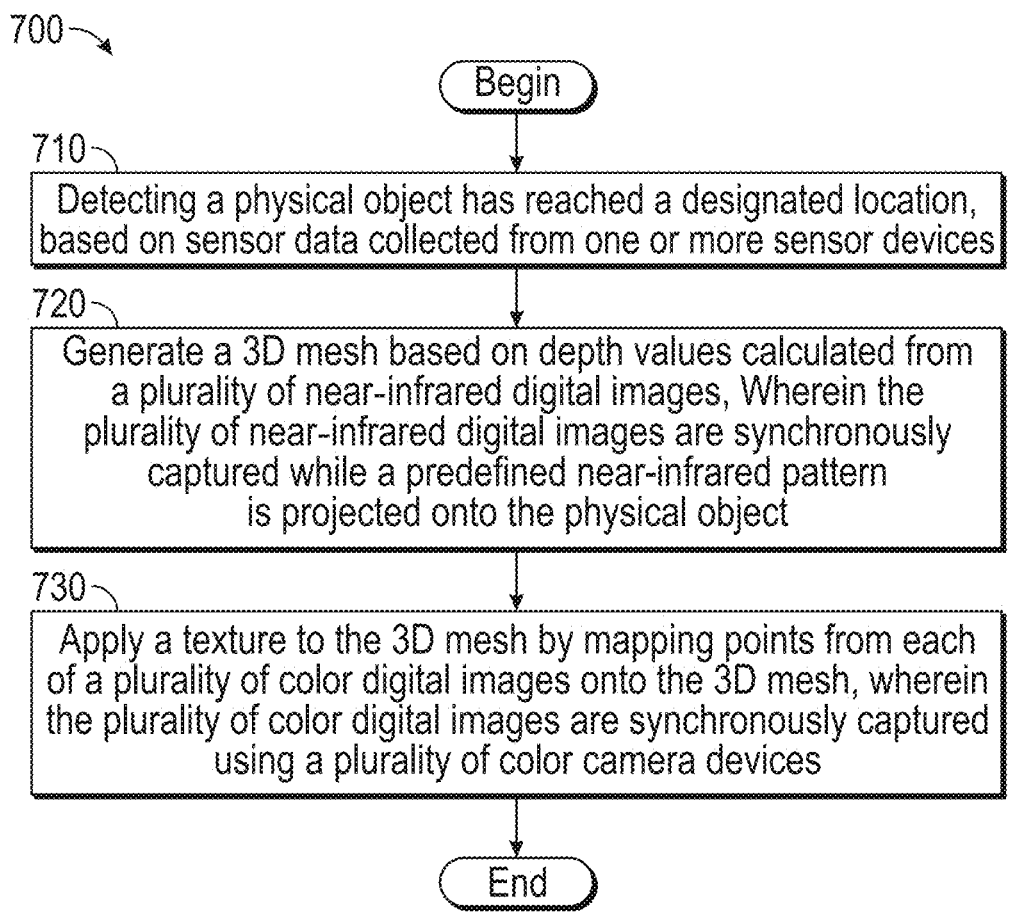
FIG. 7 is a flow diagram illustrating a method for generating a 3D model of an item, according to one embodiment described herein.

FIG. 7 is a flow diagram illustrating a method for generating a 3D model of an item, according to one embodiment described herein. As shown, the method 700 begins at block 710, where the model generation component 315 detects a physical object has reached a designated location, based on sensor data collected from one or more sensor devices. For example, the model generation component 315 could receive an indication from a light curtain sensor device, indicating the physical object has reached the designated location. The mesh generation component 320 generates a 3D mesh based on depth values calculated from a plurality of near-infrared digital images of the physical object (block 720). Generally, the near-infrared digital images are synchronously captured while a predefined near-infrared pattern is projected onto the physical object. The texture mapping component 325 then applies a texture to the 3D mesh by mapping points from each of a plurality of color digital images of the physical object onto the 3D mesh (block 730), and the method 700 ends. Similarly, the plurality of color digital images can be synchronously captured using a plurality of color camera devices.

Figure 8:
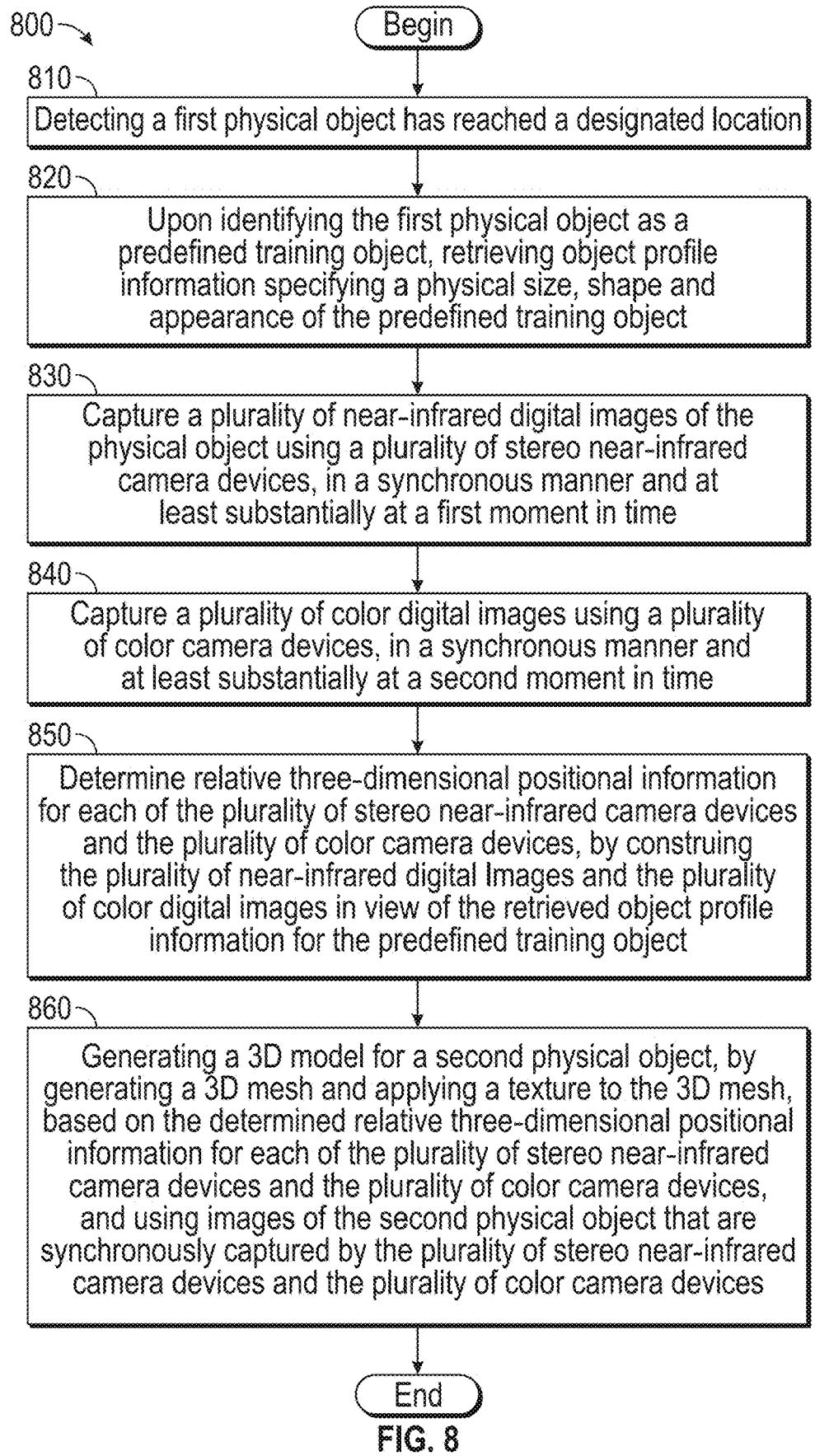
FIG. 8 is a flow diagram illustrating a method for calibrating a system for generating a 3D model of an item, according to one embodiment described herein.

FIG. 8 is a flow diagram illustrating a method for calibrating a system for generating a 3D model of an item, according to one embodiment described herein. As shown, the method 800 begins at block 810, where the model generation component 315 detects a first physical object has reached a designated location. Upon identifying the first physical object as a predefined training object, the model generation component 315 retrieves object profile information specifying a physical size, shape and appearance of the predefined training object (block 820). For example, the first physical object could be affixed with an RFID tag that contains uniquely identifying information for the first physical object, and the model generation component 315 could receive the uniquely identifying information from an RFID scanner that is positioned to scan the object's RFID tag as the object moves along the conveyer belt.

The model generation component 315 captures a plurality of digital images of the first physical object using a plurality of stereo camera devices, in a synchronous manner and at least substantially at a first moment in time (block 830). In one embodiment, the plurality of stereo camera devices are capable of operating in a non-visible wavelength range. In a particular embodiment, the stereo camera devices are capable of near-infrared camera devices capable of capturing images with certain information from the visible light spectrum (e.g., the colors of white and black). In such an embodiment, the first physical object represents a calibration object that is printed with a predefined pattern that is colored using colors that can be detected by near-infrared camera devices.

Additionally, the model generation component 315 captures a plurality of color digital images using a plurality of color camera devices, in a synchronous manner and at least substantially at a second moment in time (block 840). The model generation component 315 then determines relative three-dimensional positional information for each of the plurality of stereo camera devices and the plurality of color camera devices, by construing the plurality of digital images and the plurality of color digital images in view of the retrieved object profile information for the predefined training object (block 850). Such three-dimensional positional information can be stored as calibration information for the plurality of stereo camera devices and the plurality of color camera devices.

For example, such calibration information can be used in generating a 3D model for a subsequent item within the automated product distribution center. As shown, the model generation component 315 subsequently generates a 3D model for a second physical object, by generating a 3D mesh and applying a texture to the 3D mesh, based on the determined relative three-dimensional positional information for each of the plurality of stereo camera devices and the plurality of color camera devices, and using images of the second physical object that are synchronously captured by the plurality of stereo camera devices and the plurality of color camera devices (block 860), and the method ends.

Figure 9:
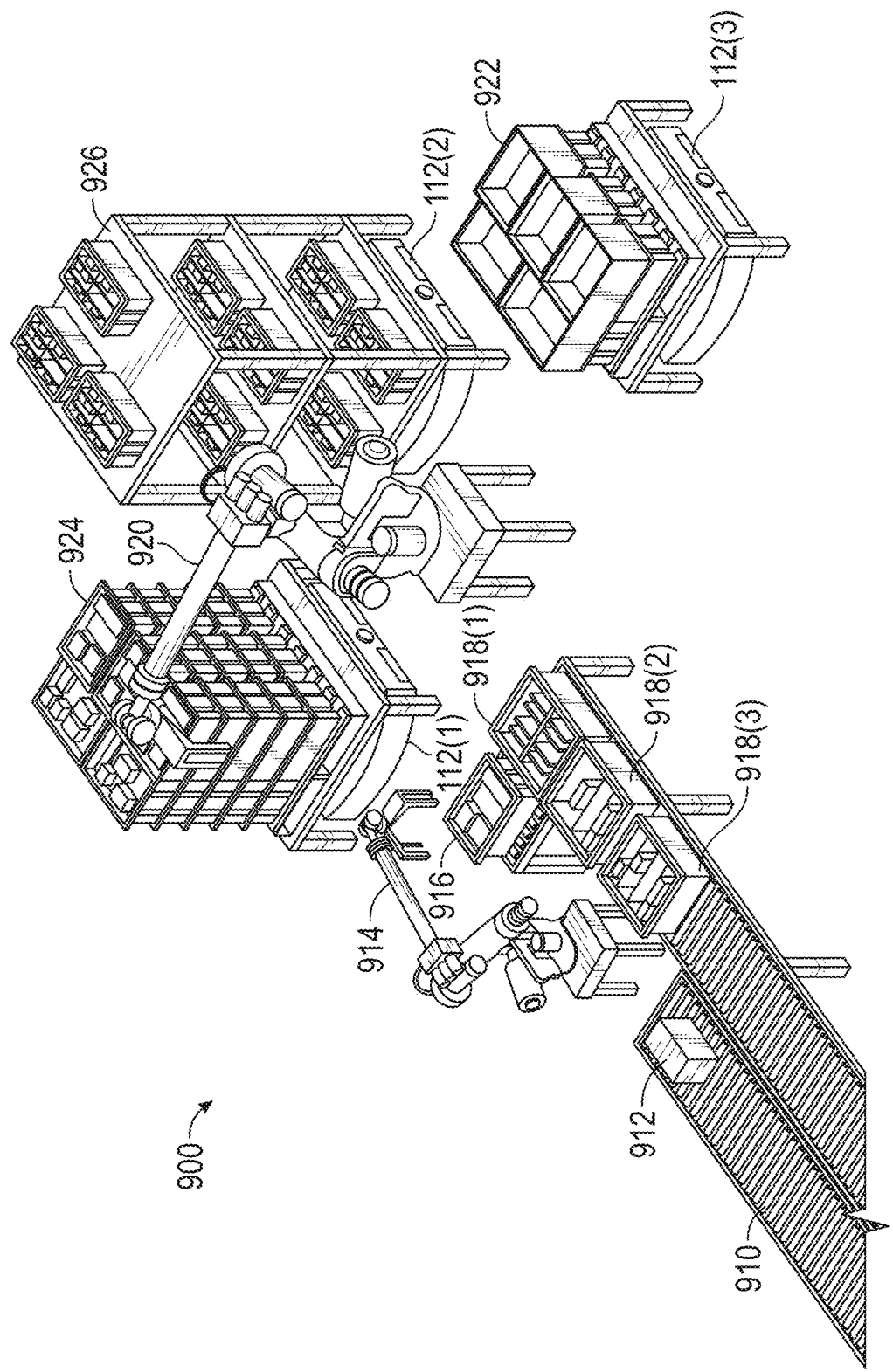
FIG. 9 is a diagram of a pick/stow station of the automated materials handling facility in which embodiments can be implemented, according to one embodiment described herein.

FIG. 9 is a diagram of a pick station 112 (also referred to as a pick/stow station) of the automated product distribution center, according to an implementation. As discussed above, the pick/stow station 900 provides the functions of item pick for a shipment set, item stow for placing items into cells of totes that are positioned on an inventory holder 926 and stored at an inventory location within an inventory area of the automated product distribution center, repositioning of items between cells of totes for consolidation of totes, and/or reconfiguration of cells of totes by autonomously repositioning the dividers within the totes.

To facilitate pick/stow operations, the management module 110 sends instructions to a first automated device 112(1), such as a mobile drive unit, that cause the first automated device 112(1) to route a sort pallet 924 from the induction station, discussed above, to the pick/stow station 900. Likewise, instructions are sent to a second automated device 112(2) that cause the second automated device to route an inventory holder 926 to the pick/stow station 900. The inventory holder 926 may be retrieved from an inventory location within the storage region 102 of the automated product distribution center. The inventory holder 926 is configured to store totes that contain inventory and is configured such that it may be autonomously transported by an automated device. In other implementations, other forms of automated storage and retrieval may be used to route an inventory holder, tote, and/or inventory to the pick/stow station. The third automated device 112(3) may receive instructions that cause the third automated device to route a pallet to the pick/stow station that is used to store and/or move empty totes 922. As will be appreciated, different automated devices may be used to route different sort pallets 924, different inventory holders 926, and/or different pallets for storing empty totes 922 to and from the pick/stow station depending on the operation(s) to be performed and/or the items to be handled.

The pick and stow functions of the pick/stow station may be performed in series and with respect to the same totes and/or pallets. For example, the management module 110 may send instructions to a first automated device 920 positioned at the pick/stow station, such as a robotic arm, that cause the first automated device 920 to pick a tote 916 from the sort pallet 924 and place the tote 916 at a first position within the pick/stow station 900. The instructions may also cause the first automated device 920 to pick a tote 918(1) from the inventory holder 926 and position the tote 918(1) at a second position within the pick/stow station 900, as illustrated.

Likewise, the management module 110 could send instructions to the second automated device 914 positioned within the pick/stow station 900, such as a second robotic arm, that cause the second automated device 914 to pick an item from the tote 916 and place the item into a cell of tote 918(1). The instructions may include information that identifies the item to be picked from the tote 916 and cell position information indicating a specific cell within the tote 918(1) into which the item is to be placed.

The second automated device 914 can utilize the information to determine the item in the tote 916 to pick and to determine the cell within the tote 918(1) into which the item is to be placed. In one example, the second automated device 914 may use an image capture device to scan the items in the tote 916 to detect the item and the position of the item within the tote prior to picking the item from the tote 916. Likewise, the cell configuration of the tote 918(1) may be known and the second automated device may place the item in a specific cell within the tote. In some implementations, the second automated device may also use vision to confirm a position or configuration of the cells and the placement of the tote within the cells.

As an alternative to placing an item picked from the tote 916 into a cell of the tote 918(1), the instructions from the management module 110 may cause the second automated device to pick a specific item from the tote 916 and place the item 912 on the induction transport 910. This may be done if an item included in the tote 916 has been associated with a shipment set that is to be fulfilled.

Alternatively, while the tote 918(1) is positioned at the pick/stow station 900, in addition to placing items picked from tote 916 into cells of the tote 918(1), the management module 110 may send instructions to the second automated device 914 that cause the second automated device 914 to pick an item from a specific cell of the tote 918(1) and place the item on the induction transport 910. For example, the second automated device may pick item 912 from a cell of the tote 918(1) in response to instructions from the management module 110 that instruct the second automated device to perform a pick action and identify a position or identifier of a cell within the tote 918(1) from which the item is to be picked.

In some implementations, the first automated device 920, or other automated devices, may place multiple totes, such as totes 918(1), 918(2), 918(3) onto a conveyor of the pick/stow station 900. In such a configuration, the instructions from the material handling control system may instruct the second automated device 916 to pick items from the tote 916 obtained from the sort pallet 924 and place those items into cells of the different totes 918(1), 918(2), 918(3). Likewise, the management module 110 may send instructions to the second automated device to pick one or more items from one or more cells of the totes 918(1), 918(2), 918(3) and place the one or more items on the induction transport 910 so that the item(s) are routed to a packing station for fulfillment of one or more shipment sets.

Still further, the management module 110 may send instructions to the second automated device that cause the second automated device to pick an item from a cell of one of the totes 918(1), 918(2), 918(3) and place the item in a cell of another tote 918(1), 918(2), 918(3). For example, if tote 918(2) includes only one remaining item, the management module 110 may send instructions to the second automated device that cause the second automated device 914 to pick the item from the cell of the tote 918(2) and place the item in a cell of tote 918(3).

Generally, control logic for the automated devices 914 and 920 can manipulate the behavior of a robotic arm of the automated devices 914 and 920 to carry out the instructions. In doing so, the control logic can take into account a 3D model of an item to be manipulated that was generated by the model generation system 150. For example, the management module 110 could send instructions to the second automated device 914 positioned within the pick/stow station 900, that cause the control logic for the second automated device 914 to manipulate its robotic arm to pick an item from the tote 916 and place the item into a cell of tote 918(1). The instructions may include information that identifies the item to be picked from the tote 916 and cell position information indicating a specific cell within the tote 918(1) into which the item is to be placed.

Upon receiving the instructions, the control logic could retrieve a previously generated 3D model that corresponds to the identifying information for the item to be picked from the tote 916. For example, the instructions could specify a unique identifier corresponding to the item. Upon retrieving the 3D model, the control logic could use the 3D model for a variety of different purposes, including item detection, image segmentation and item pose estimation. For example, the control logic could capture an image of the tote 916 and could perform an object identification analysis to identify one or more portions of the image that are each representative of a respective object within the tote. The control logic could then compare each of the identified portions to appearances of the 3D model from multiple different viewpoints, to determine whether any of the identified portions sufficiently correspond to a view of the 3D model. For example, if the control logic determines that a particular portion of the captured image is sufficiently similar in appearance to the appearance of the 3D model when viewed from a particular direction, the control logic could determine that the identified item is present within the tote 916 at the location corresponding to the matching portion of the image.

For example, in one embodiment, the robotic arm may be configured with multiple different suction devices of various sizes, with particular suction devices being more optimal for retrieving a particular item (e.g., a suction device that is smaller may not be capable of maintaining sufficient pressure to lift a heavier item, while another suction device may be larger than a surface of the item). Additionally, for some objects, a particular surface may be preferable to other surfaces of the object (e.g., a flat surface that allows little or no air to pass through may be preferable for gripping with a suction device, relative to a malleable surface of a material that allows air to easily pass through). As such, the control logic could determine an optimal surface on which to pick-up the item (e.g., based on an item profile for the item) and could determine a three-space location of the optimal surface based on the pose estimation for the item. The control logic could then direct the robotic arm to use the optimally sized suction tool to grasp the item on the optimal surface. By using the 3D model for the item, the control logic can more accurately determine how and where to optimally grasp the item, thereby improving the functionality of the automated devices 914 and 920.

Additionally, the control logic could estimate the item's pose (or orientation) within the tote 916. Based on such a pose estimation, the control logic could determine an optimal way to retrieve the item from the tote 916 using the robotic arm. For example, the robotic arm may be capable of grasping an item from a number of different directions, but one or more specific directions may be preferable (e.g., resulting in the robotic arm attaining a more secure grip on the item). The control logic could determine a particular viewpoint for viewing the 3D model that best matches the item's appearance within the tote 916, and the control logic could use calibration information that estimates the three-space position of the camera device that captured the image of the item, relative to the pre-defined position where the tote 916 is located, to estimate the item's pose within the tote 916. Using the pose estimation, the control logic could select an optimal manner for retrieving the item from the tote 916 using the robotic arm.

Figure 10:
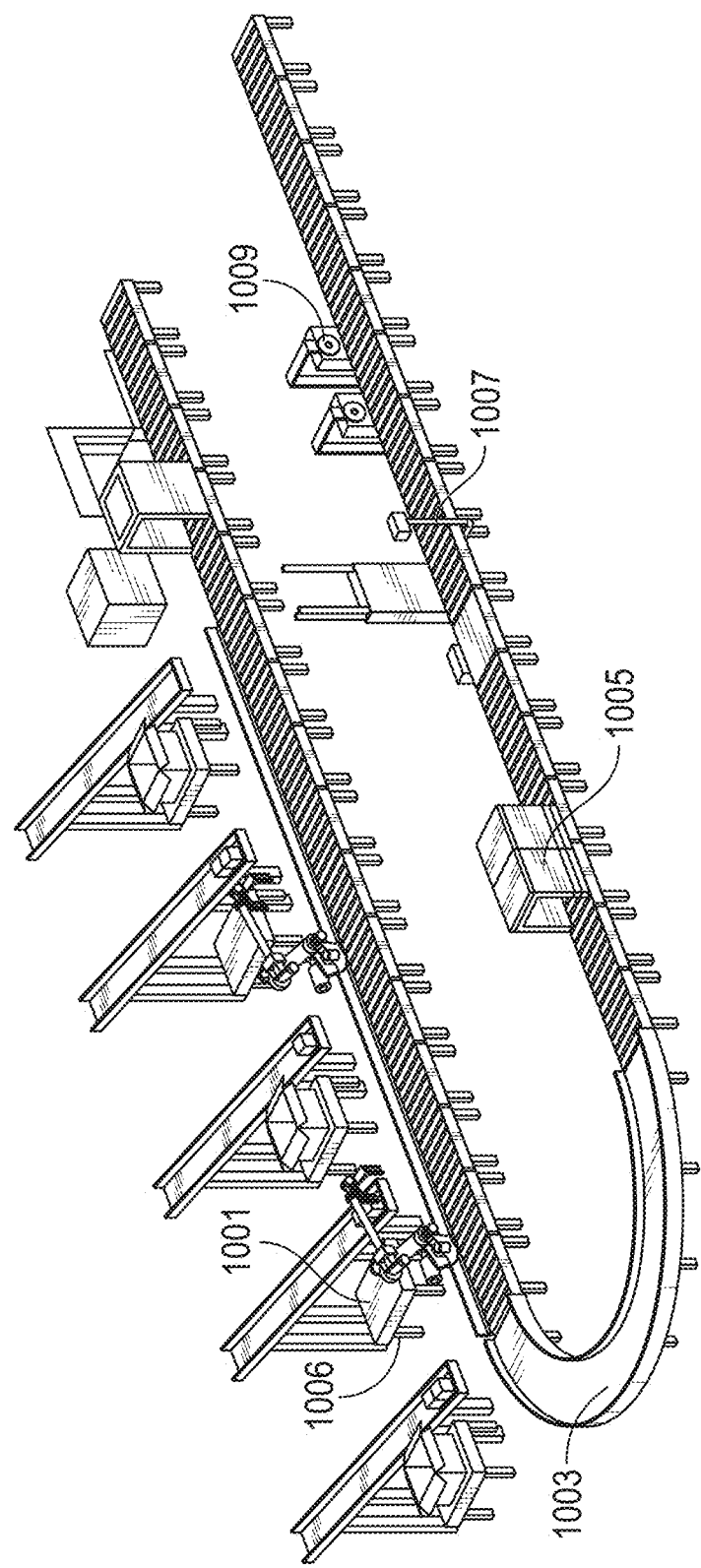
FIG. 10 is a diagram of a packing station in which embodiments can be implemented, according to one embodiment described herein.

FIG. 10 is a diagram of a packing station in which embodiments can be implemented, according to one embodiment described herein. As discussed above, picked items that are used to fulfill a shipment set can be routed by an automated sorter and deposited into a packing slot associated with the item and/or the shipment set. When all the items of the shipment set are positioned in the packing slot, an automated device 1001 (depicted as a robotic arm) is used to pick the items from the packing slot and place the items into a container that is sent along the conveyor 1003 to a shipping station, as discussed above.

For example, a materials handling control system could send instructions to an automated container erection device that causes the automated container erection device to erect a container. The automated container erection device may utilize corrugate to erect a container into which one or more items are placed for shipping. The erected container could then be routed along the conveyor 1003 to a position of the packing slot from which items are to be picked and packed into the container. The automated device 1001 could pick the erected container from the conveyor 1003 and could place the erected container on a pack assembly 1006, so that items from the packing slot can be packed into the container.

In one embodiment, the object capture system 200 could be deployed within the station 1005, and the object capture system 200 could be configured to capture both color images and infrared images of an object passing under the station 1005 on the conveyor belt 1003. In a particular embodiment, the object capture system 200 is configured to receive a signal when the object passes through the laser sensor 1009. In such an embodiment, an RFID antenna can be deployed along the conveyor 1003 to read an RFID tag from the object, and to determine a unique identifier for the object from the RFID tag. Such identifying information could be transmitted to the object capture system 200, together with the indication that the object passed through the laser sensor 1009. The object capture system 200 could then determine, based on a known distance on the conveyor 1003 between the station 1005 and the laser sensor 1009, and further based on a known speed of the conveyor 1003, a time at which the object will pass through the station 1005. Similarly, the light curtain sensor 1007 could transmit a signal to the object capture system 200 when the object passes by the light curtain sensor 1007, and the object capture system 200 could extrapolate the time at which the product will pass through the station 1005 based on the speed of the conveyor 1003 and the distance between the station and the light curtain sensor 1007. Doing so enables the object capture system 200 to capture images of the object, when the object is positioned at the optimal viewing location along the conveyor 1003.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, the model generation component 315 could execute on a computing system in the cloud and could receive digital images 345 captured by the object capture system 200. The model generation component 315 could analyze the digital images in view of three-space positional data for a plurality of stereo near-infrared cameras 370 in order to generate a 3D mesh for a 3D model 353. The model generation component 315 could then apply textures to the generated 3D mesh, by re-projecting the 3D model back to a plurality of color images captured by color cameras 375 of the object capture system 200, in view of three-space positional data for the color cameras 375. The model generation component 315 could then provide the resulting 3D model 353 to one or more robotic arm controllers 390 (e.g., within a product distribution center), for use in detecting and retrieving objects. Doing so allows users to access the 3D models from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
 one or more computer processors;
 a plurality of stereo near-infrared camera devices oriented to capture images of a first predefined location from a first plurality of viewpoints;
 a plurality of near-infrared projectors oriented to project infrared light onto the first predefined location from a second plurality of viewpoints;
 a plurality of color camera devices oriented to capture color images of the first predefined location from a third plurality of viewpoints, wherein the plurality of color camera devices capture light in a visible light spectrum; and
 a memory containing computer program code that, when executed by operation of the one or more computer processors, performs an operation comprising:
  receiving an indication that a first physical object moving along a fixed path has reached the first predefined location;
  projecting a predefined pattern onto the first physical object, using the plurality of near-infrared projectors;
  synchronously capturing a plurality of near-infrared digital images of the first physical object using the plurality of stereo near-infrared camera devices, while the predefined pattern is being projected onto the first physical object, the plurality of near-infrared digital images including a first subset of near-infrared digital images and a remainder of near-infrared digital images;
  determining, for each of the first subset of near-infrared digital images, a respective first set of depth measurements;
  generating a three-dimensional (3D) mesh by merging the first set of depth measurements for each of the first subset of near-infrared digital images, based on first positional information for a first subset, of the plurality of stereo near-infrared camera devices, that captured the first subset of near-infrared digital images;
  synchronously capturing a plurality of color digital images using the plurality of color camera devices, the plurality of color digital images including a first subset of color digital images and a remainder of color digital images;
  applying a texture to the 3D mesh by mapping points from each of the first subset of the plurality of color digital images onto the 3D mesh, based on positional information for a first subset, of the plurality of color camera devices, that captured the first subset of color digital images, to generate a 3D model of the first physical object;
  performing (i) a mesh verification of the 3D model using the remainder of near-infrared digital images and (ii) a texture verification of the 3D model using the remainder of color digital images;
  upon success of both of the mesh verification and the texture verification, determining that the 3D model is properly generated, wherein the computer program code is configured to, upon failure of at least one of the mesh verification or the texture verification, discard the 3D model and reinitiate the operation on the first physical object to regenerate the 3D model;
  regenerating the 3D model upon determining that based on the 3D model, a robot arm controller has performed a predefined number of failed picking operations within a designated time window on one or more physical objects identified as being of a same type as the first physical object.

2. The system of claim 1, wherein performing the mesh verification comprises:
 determining, for each of the remainder of near-infrared digital images, a respective second set of depth measurements;
 comparing the second set of depth measurements to the first set of depth measurements for points on the 3D mesh from a perspective of a second subset, of the plurality of stereo near-infrared camera devices, that captured the remainder of near-infrared digital images; and
 verifying the 3D model of the first physical object, based on the comparison.

3. The system of claim 1, wherein based on the regenerated 3D model, a picking operation is performed successfully, wherein the remainder of near-infrared digital images is not used in generating the 3D mesh, wherein the remainder of color digital images is not used in applying the texture to the 3D mesh, wherein the plurality of near-infrared digital images and the plurality of color digital images are captured by an object capture system and transmitted via a network to a model generation system;

wherein the model generation system is configured to output and transmit the 3D model via the network to the robotic arm controller;

wherein the robotic arm controller is configured to perform the picking operation by controlling, based on the regenerated 3D model and without requiring user intervention, movement of a robotic arm to retrieve a second physical object identified as being of a same type as the first physical object, wherein the second physical object is retrieved to fulfill an order from a requesting entity.

4. The system of claim 3, the operation further comprising:

prior to applying the texture to the 3D mesh, performing one or more optimization operations on the 3D mesh, the one or more optimization operations including a screened Poisson reconstruction to fit a surface onto the 3D mesh;

identifying that the second object is of the same type as the first physical object, based on radio-frequency identification (RFID) tags associated with the first and second physical objects;

capturing one or more digital images of the second physical object using one or more camera devices; and determining one or more attributes associated with the second physical object, by analyzing the captured one or more digital images in view of the 3D model, wherein the one or more attributes include at least one of (i) object detection, (ii) image segmentation, and (iii) object pose estimation.

5. The system of claim 4, wherein controlling the movement of the robotic arm further comprises:

selecting one of a plurality of gripping methods that the robotic arm is configured to perform, for retrieving the second physical object;

determining one or more three-space positions at which to make contact with the second physical object using the robotic arm, based on the determined one or more attributes associated with the second physical object; and determining an angle of approach for retrieving the second physical object using the robotic arm, based on the determined one or more attributes associated with the second physical object.

6. The system of claim 1, the operation further comprising:

calibrating the plurality of stereo near-infrared camera devices and the plurality of color camera devices, using a predefined physical training object.

7. The system of claim 6, wherein calibrating the plurality of stereo near-infrared camera devices and the plurality of color camera devices further comprises:

detecting the predefined physical training object has reached a second predefined location;

retrieving object profile information specifying a physical size, shape and appearance of the predefined physical training object;

capturing a plurality of near-infrared digital images of the predefined physical training object using the plurality of stereo near-infrared camera devices, in a synchronous manner and at least substantially at a first moment in time;

capturing a plurality of color digital images of the predefined physical training object using the plurality of color camera devices, in a synchronous manner and at least substantially at a second moment in time; and determining relative 3D positional information for each of the plurality of stereo near-infrared camera devices and the plurality of color camera devices, by construing the plurality of near-infrared digital images and the plurality of color digital images in view of the retrieved object profile information for the predefined physical training object.

8. A computer-implemented method, comprising:

detecting a first physical object has reached a designated location, based on sensor data collected from one or more sensor devices;

generating a three-dimensional (3D) mesh based on depth values calculated from a first subset of a plurality of near-infrared digital images of the first physical object, wherein the plurality of near-infrared digital images are synchronously captured by a plurality of stereo near-infrared camera devices while a predefined near-infrared pattern is projected onto the first physical object;

generating a 3D model of the first physical object by applying a texture to the 3D mesh, wherein applying the texture includes mapping points from each of a first subset of a plurality of color digital images of the first physical object onto the 3D mesh, wherein the plurality of color digital images are synchronously captured using a plurality of color camera devices that capture light in a visible light spectrum;

performing, by operation of one or more computer processors, (i) a mesh verification of the 3D model using a remainder of the plurality of near-infrared digital images and (ii) a texture verification of the 3D model using a remainder of the plurality of color digital images;

upon success of both of the mesh verification and the texture verification, determining that the 3D model is properly generated, wherein the computer-implemented method is performed by a program configured to, upon failure of at least one of the mesh verification or the texture verification, discard the 3D model and reinitiate the computer-implemented method on the first physical object to regenerate the 3D model;

regenerating the 3D model upon determining that based on the 3D model, a robotic arm controller has performed a predefined number of failed picking operations within a designated time window on one or more physical objects identified as being of a same type as the first physical object.

9. The computer-implemented method of claim 8, wherein performing the mesh verification comprises:

determining a measure of accuracy of the textured 3D mesh, using the remainder of the plurality of near-infrared digital images; and determining whether the measure of accuracy is below a minimum accuracy threshold.

10. The computer-implemented method of claim 8, further comprising:

prior to applying the texture to the 3D mesh, performing one or more optimization operations on the 3D mesh, the one or more optimization operations including a screened Poisson reconstruction to fit a surface onto the 3D mesh; and performing one or more clean-up operations on the optimized 3D mesh, using one or more pre-defined clean-up rules that specify criteria for identifying and removing extraneous or invalid polygon geometry from the 3D mesh.

11. The computer-implemented method of claim 10, wherein generating the 3D mesh comprises:
accessing calibration information specifying relative 3D positional information for each of a first subset, of the plurality of stereo near-infrared camera devices, that captured the first subset of the plurality of near-infrared digital images;
calculating the depth values from the first subset of the plurality of near-infrared digital images, by, for each of the first subset of the plurality of stereo near-infrared camera devices, mapping points within a first image captured using a first lens of the respective camera device to points within a second image captured using a second lens of the respective camera device, based on predefined information describing an appearance of the projected predefined near-infrared pattern; and
merging the depth values from the first subset of the plurality of stereo near-infrared camera devices to create the 3D mesh, based on the relative 3D positional information for each of the first subset of the plurality of stereo near-infrared camera devices.

12. The computer-implemented method of claim 11, wherein applying the texture to the 3D mesh comprises:
accessing calibration information specifying relative 3D positional information for each of the first subset of the plurality of color camera devices; and
re-projecting points from a 3D model of the first physical object back to the first subset of the plurality of color digital images, using the relative 3D positional information for each of the first subset of the plurality of color camera devices.

13. The computer-implemented method of claim 8, wherein based on the regenerated 3D model, a picking operation is performed successfully on a second physical object identified as being of a same type as the first physical object, wherein the remainder of the plurality of near-infrared digital images is not used in generating the 3D mesh, wherein the remainder of the plurality of color digital images is not used in applying the texture to the 3D mesh, wherein the computer-implemented method further comprises:
identifying that the second physical object is of the same type as the first physical object, based on radio-frequency identification (RFID) tags associated with the first and second physical objects;
capturing, using one or more camera devices, one or more digital images of the second physical object;
determining one or more attributes associated with the second physical object, by analyzing the captured one or more digital images in view of the 3D model of the first physical object, wherein the one or more attributes include at least one of (i) object detection, (ii) image segmentation, and (iii) object pose estimation; and
performing the picking operation by controlling a movement of a robotic arm to retrieve the second physical object, based on the determined one or more attributes associated with the second physical object.

14. The computer-implemented method of claim 13, wherein controlling the movement of the robotic arm further comprises:

selecting one of a plurality of gripping methods that the robotic arm is configured to perform, for retrieving the second physical object;
determining one or more three-space positions at which to make contact with the second physical object using the robotic arm, based on the determined one or more attributes associated with the second physical object; and
determining an angle of approach for retrieving the second physical object using the robotic arm, based on the determined one or more attributes associated with the second physical object.

15. A non-transitory computer-readable medium containing computer program code executable to perform an operation comprising:
detecting a first physical object has reached a designated location;
upon identifying the first physical object as a predefined training object, retrieving object profile information specifying a physical size, shape, and appearance of the predefined training object;
capturing near-infrared digital images of the first physical object using a plurality of stereo near-infrared camera devices, in a synchronous manner and at least substantially at a first moment in time;
capturing color digital images of the first physical object using a plurality of color camera devices, in a synchronous manner and at least substantially at a second moment in time, wherein the plurality of color camera devices capture light in a visible light spectrum;
determining relative three-dimensional (3D) positional information for each of the plurality of stereo near-infrared camera devices and the plurality of color camera devices, by construing the near-infrared digital images and the color digital images in view of the retrieved object profile information for the predefined training object;
storing the relative 3D positional information as calibration information for the plurality of stereo near-infrared camera devices and the plurality of color camera devices;
generating a 3D model for a second physical object, by generating a 3D mesh and applying a texture to the 3D mesh, based on the determined relative 3D positional information for each of a first subset of the plurality of stereo near-infrared camera devices and a first subset of the plurality of color camera devices, and using images of the second physical object, the images including (i) a first subset of a plurality of near-infrared digital images synchronously captured by the plurality of stereo near-infrared camera devices and (ii) a first subset of a plurality of color digital images synchronously captured by the plurality of color camera devices;
performing, by one or more computer processors when executing the computer program code, (i) a mesh verification of the 3D model using a remainder of the plurality of near-infrared digital images and (ii) a texture verification of the 3D model using a remainder of the plurality of color digital images;
upon success of both of the mesh verification and the texture verification, determining that the 3D model is properly generated, wherein the computer program code is configured to, upon failure of at least one of the mesh verification or the texture verification, discard the 3D model and reinitiate the operation on the second physical object to regenerate the 3D model; and outputting the 3D model, wherein the 3D model is regenerated upon determining that based on the 3D model, a robotic arm controller has performed a predefined number of failed picking operations within a designated time window on one or more physical objects identified as being of a same type as the second physical object.

16. The non-transitory computer-readable medium of claim 15, wherein generating the 3D mesh comprises:
   accessing the calibration information for each of a first subset, of the plurality of stereo near-infrared camera devices, that captured the first subset of the plurality of near-infrared digital images;
   calculating depth values from the first subset of the plurality of near-infrared digital images, by, for each of the first subset of the plurality of stereo near-infrared camera devices, mapping points within a first image captured using a first lens of the respective stereo near-infrared camera device to points within a second image captured using a second lens of the respective stereo near-infrared camera device, based on predefined information describing an appearance of a projected predefined pattern; and
   merging the depth values from the first subset of the plurality of stereo near-infrared camera devices to create the 3D mesh, based on the relative 3D positional information for each of the first subset of the plurality of stereo near-infrared camera devices.

17. The non-transitory computer-readable medium of claim 15, wherein applying the texture to the 3D mesh comprises:
   accessing calibration information specifying relative 3D positional information for each of a first subset, of the plurality of color camera devices, that captured the first subset of the plurality of color digital images; and
   re-projecting points from the 3D model of the second physical object back to the first subset of the plurality of color digital images, using the relative 3D positional information for each of the first subset of the plurality of color camera devices.

18. The non-transitory computer-readable medium of claim 15, wherein based on the regenerated 3D model, a picking operation is performed successfully, wherein the remainder of the plurality of near-infrared digital images is not used in generating the 3D mesh, wherein the remainder of the plurality of color digital images is not used in applying the texture to the 3D mesh, wherein the plurality of near-infrared digital images and the plurality of color digital images are captured by an object capture system and transmitted via a network to a model generation system;
   wherein the model generation system is configured to output and transmit the 3D model via the network to the robotic arm controller;
   wherein the robotic arm controller is configured to perform the picking operation by controlling, based on the regenerated 3D model and without requiring user intervention, movement of a robotic arm to retrieve a third physical object identified as being of a same type as the second physical object, wherein the third physical object is retrieved to fulfill an order from a requesting entity, wherein the second and third physical objects are not predefined training objects.

19. The non-transitory computer-readable medium of claim 18, the operation further comprising:
   prior to applying the texture to the 3D mesh, performing one or more optimization operations on the 3D mesh, the one or more optimization operations including a screened Poisson reconstruction to fit a surface onto the 3D mesh;
   identifying that the third physical object is of the same type as the second physical object, based on radio-frequency identification (RFID) tags associated with the second and third physical objects;
   capturing one or more digital images of the third physical object using one or more camera devices; and
   determining one or more attributes associated with the third physical object, by analyzing the captured one or more digital images in view of the 3D model, wherein the one or more attributes include at least one of (i) object detection, (ii) image segmentation, and (iii) object pose estimation.

20. The non-transitory computer-readable medium of claim 19, wherein controlling the movement of the robotic arm comprises:
   selecting one of a plurality of gripping methods that the robotic arm is configured to perform, for retrieving the third physical object;
   determining one or more three-space positions at which to make contact with the third physical object using the robotic arm, based on the determined one or more attributes associated with the third physical object; and
   determining an angle of approach for retrieving the third physical object using the robotic arm, based on the determined one or more attributes associated with the third physical object.

* * * * *

UNITED STATES PATENT AND TRADEMARK OFFICE
CERTIFICATE OF CORRECTION

PATENT NO. : 10,958,895 B1
APPLICATION NO. : 15/725031
DATED : March 23, 2021
INVENTOR(S) : Gurunandan Krishnan Gorumkonda Page 1 of 1

It is certified that error appears in the above-identified patent and that said Letters Patent is hereby corrected as shown below:

In the Claims

In Column 27, Line 8, in Claim 11, delete "3 D" and insert -- 3D --, therefor.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*